United States Patent
Liu

(10) Patent No.: US 12,211,163 B2
(45) Date of Patent: Jan. 28, 2025

(54) METHOD AND APPARATUS FOR INTERACTION PROCESSING OF VIRTUAL ITEM, ELECTRONIC DEVICE, AND READABLE STORAGE MEDIUM

(71) Applicant: TENCENT TECHNOLOGY (SHENZHEN) COMPANY LIMITED, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 138 days.

(21) Appl. No.: 17/971,943

(22) Filed: Oct. 24, 2022

(65) Prior Publication Data

US 2023/0040737 A1 Feb. 9, 2023

Related U.S. Application Data

(63) Continuation of application No. PCT/CN2021/113264, filed on Aug. 18, 2021.

(30) Foreign Application Priority Data

Sep. 29, 2020 (CN) .......................... 202011057428.1

(51) Int. Cl.
G06T 19/20 (2011.01)
G06T 7/70 (2017.01)
(Continued)

(52) U.S. Cl.
CPC ................ *G06T 19/20* (2013.01); *G06T 7/70* (2017.01); *G06T 17/00* (2013.01); *G06T 19/003* (2013.01);
(Continued)

(58) Field of Classification Search
CPC ...... G06V 20/20; G06V 10/761; G06V 10/26; G06V 40/18; G06T 19/003; G06T 19/20;
(Continued)

(56) References Cited

U.S. PATENT DOCUMENTS 11,007,439 B1 * 5/2021 Pineda .................. A63F 13/847
11,358,058 B2 6/2022 Wang
(Continued)

FOREIGN PATENT DOCUMENTS

CN 108815849 A 11/2018
CN 109876438 A 6/2019
(Continued)

OTHER PUBLICATIONS

The Japan Patent Office (JPO) Notification of Reasons for Refusal for Application No. 2022-555126 and Translation Aug. 1, 2023 12 Pages.
(Continued)

*Primary Examiner* — Xilin Guo
(74) *Attorney, Agent, or Firm* — ANOVALAW GROUP PLLC

(57) ABSTRACT

This application provides a method and an apparatus for interaction processing of a virtual item, an electronic device, and a computer-readable storage medium. The method includes displaying at least one idle virtual item in a virtual scene; moving a first virtual object in the virtual scene in response to a movement operation on the first virtual object; displaying a pickable prompt of the idle virtual item when there is no obstacle between the idle virtual item and the first
(Continued)

virtual object; and controlling the first virtual object to pick up the idle virtual item in response to a picking-up operation by the first virtual object.

19 Claims, 13 Drawing Sheets

(51) Int. Cl.
*G06T 17/00* (2006.01)
*G06T 19/00* (2011.01)
*G06V 10/26* (2022.01)
*G06V 10/74* (2022.01)

(52) U.S. Cl.
CPC ............ *G06V 10/26* (2022.01); *G06V 10/761* (2022.01); *G06T 2219/024* (2013.01); *G06T 2219/2004* (2013.01)

(58) Field of Classification Search
CPC ..... G06T 7/70; G06T 17/00; G06T 2219/024; G06T 2219/2004; G06T 2207/10016; G06T 13/40; G06F 3/011; G06F 3/017; G06F 3/04815; H04N 23/635; H04N 23/63; A63F 13/92; A63F 13/30
See application file for complete search history.

(56) References Cited

U.S. PATENT DOCUMENTS

| | | | |
|---|---|---|---|
| 11,471,768 | B2 | 10/2022 | Chan et al. |
| 2013/0059634 | A1 | 3/2013 | Behmaram-Mosavat et al. |
| 2021/0031106 | A1* | 2/2021 | Alderman ............. A63F 13/573 |
| 2022/0126206 | A1* | 4/2022 | Rossi ................. G06Q 30/0271 |

FOREIGN PATENT DOCUMENTS

| | | |
|---|---|---|
| CN | 111282275 A | 6/2020 |
| CN | 111672123 A | 9/2020 |
| CN | 112121431 A | 12/2020 |
| JP | 2019136358 A | 8/2019 |

OTHER PUBLICATIONS

China National Intellectual Property Administration (CNIPA) Office Action 1 for 202011057428.1 Oct. 11, 2021 18 Pages (including translation).
The World Intellectual Property Organization (WIPO) International Search Report for PCT/CN2021/113264 Oct. 26, 2021 7 Pages (including translation).
Zchen, "How to Quickly Pick up Equipment for Jedi Survival", Jan. 19, 2018, https://www.zuiben.compc_17/3/134109.html.

* cited by examiner

METHOD AND APPARATUS FOR INTERACTION PROCESSING OF VIRTUAL ITEM, ELECTRONIC DEVICE, AND READABLE STORAGE MEDIUM

RELATED APPLICATIONS

This application is a continuation of PCT Application No. PCT/CN2021/113264, filed on Aug. 18, 2021, which in turn claims priority to Chinese Patent Application No. 202011057428.1 filed on Sep. 29, 2020. The two applications are both incorporated by reference in their entirety.

FIELD OF THE TECHNOLOGY

This application relates to human-computer interaction technologies, and in particular, to a method and an apparatus for interaction processing of a virtual item, an electronic device, and a computer-readable storage medium.

BACKGROUND OF THE DISCLOSURE

Display technologies based on graphics processing hardware expand channels for perceiving environments and obtaining information, especially display technologies for virtual scenes, which can realize diverse interactions between virtual objects controlled by users or artificial intelligence according to application requirements, and have various application scenarios. For example, in virtual scenes of fight simulation, games, and the like, a real battle process between virtual objects can be simulated.

SUMMARY

Embodiments of this application provide a method and an apparatus for interaction processing of a virtual item, an electronic device, and a computer-readable storage medium, which can implement accurate picking in accordance with physical laws in virtual scenes.

The technical solutions of the embodiments of this application are implemented as follows:

An embodiment of this application provides a method for interaction processing of a virtual item. The method includes displaying at least one idle virtual item in a virtual scene; moving a first virtual object in the virtual scene in response to a movement operation on the first virtual object; displaying a pickable prompt of the idle virtual item when there is no obstacle between the idle virtual item and the first virtual object; and controlling the first virtual object to pick up the idle virtual item in response to a picking-up operation by the first virtual object.

An embodiment of this application provides an electronic device for interaction processing of a virtual item, including a memory, configured to store executable instructions; and a processor, configured to implement, when executing the executable instructions stored in the memory, the method for interaction processing of a virtual item provided in the embodiments of this application.

An embodiment of this application provides a non-transitory computer-readable storage medium, storing executable instructions, the executable instructions, when executed by a processor, being configured to implement the method for interaction processing of a virtual item provided in the embodiments of this application.

In embodiments of the present disclosure, obstacles between the idle virtual items and the equipped virtual item of the first virtual object are detected, so that when there is no obstacle between the idle virtual items and the virtual object, the function of picking up the virtual items can be implemented. Embodiments of the present disclosure implement accurate picking in accordance with physical laws, improves the accuracy of human-computer interaction in the virtual scene, and further improves the actual utilization of computing resources consumed in the virtual scene.

DESCRIPTION OF EMBODIMENTS

Figure 1A:
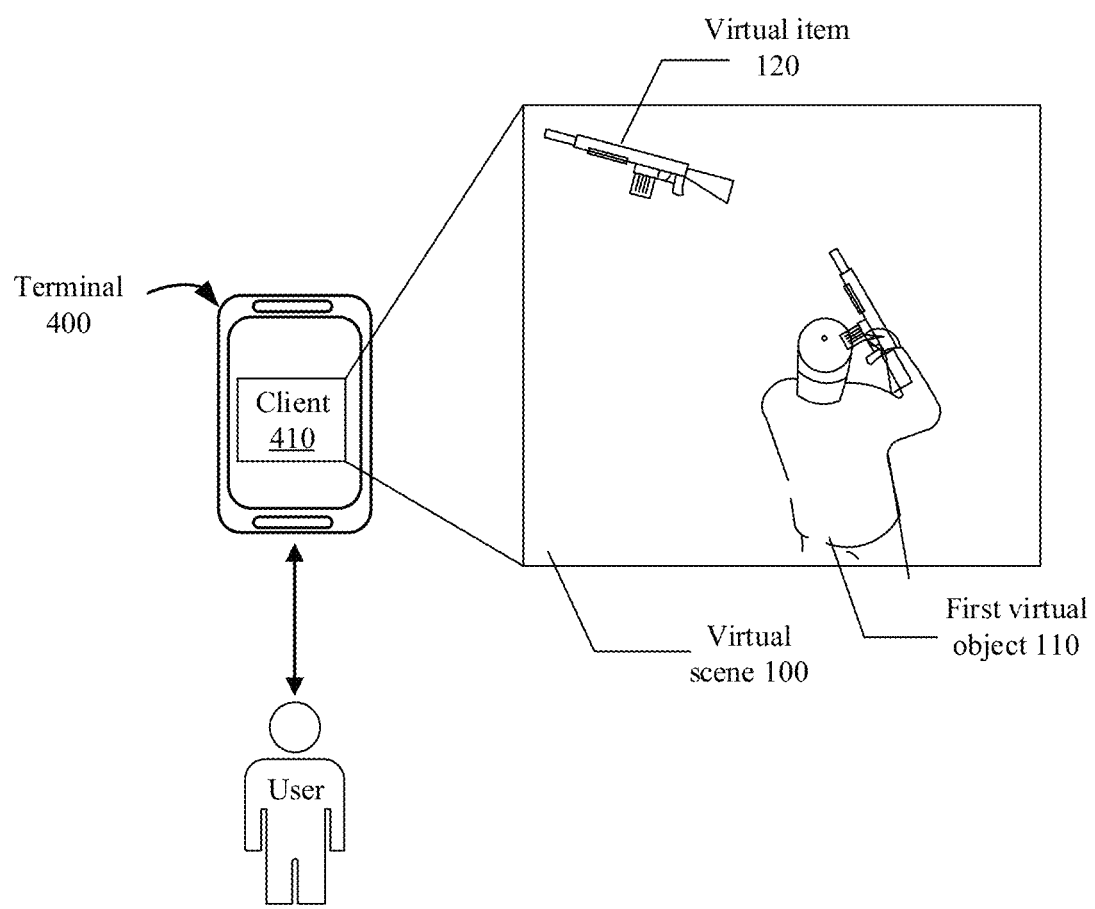
FIG. 1A and FIG. 1B are schematic diagrams of application modes of a method for interaction processing of a virtual item according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, terms involved in the embodiments of this application are described. The terms provided in the embodiments of this application are applicable to the following explanations.

1) Virtual scene: A virtual scene is a scene that is outputted by using a device and that is different from the real world. Visual perception of the virtual scene can be formed with the aid of naked eyes or devices, for example, by using two-dimensional images outputted by using a display screen or three-dimensional images outputted by using a three-dimensional display technology such as a three-dimensional projection, virtual reality, or augmented reality technology. In addition, a variety of perception simulating the real world such as auditory perception, tactile perception, olfactory perception, and motion perception can be further formed by using a variety of possible hardware.

2) In response to: It is used for representing a condition or status on which one or more operations to be performed depend. When the condition or status is satisfied, the one or more operations may be performed immediately or after a delay. Unless explicitly stated, there is no limitation on the order in which the plurality of operations are performed.

3) Client: It is an application running on a terminal to provide various services, such as a game client.

4) Virtual object: Virtual objects are images of various people and things that can interact in a virtual scene, or movable objects in the virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing the user in the virtual scene. The virtual scene may include a plurality of virtual objects, and each virtual object has a shape and a volume in the virtual scene, and occupies some space in the virtual scene.

For example, the virtual object may be a player character controlled through an operation on a client, or an artificial intelligence (AI) character set in a virtual scene battle through training, or a non-player character (NPC) set in a virtual scene for interaction. The virtual object may be a virtual character for performing adversarial interaction in a virtual scene. For example, a quantity of virtual objects participating in the interaction in the virtual scene may be preset, or may be dynamically determined according to a quantity of clients participating in the interaction.

For example, in a shooting game, the user may control the virtual object to descend freely, glide, parachute, or the like in the sky of the virtual scene, or run, jump, crawl, stoop to move forward, or the like on the land, or swim, float, dive, or the like in the ocean. Certainly, the user may alternatively control the virtual object to drive a virtual vehicle to move in the virtual scene. The virtual vehicle may be a virtual car, a virtual aircraft, a virtual yacht, or the like. The foregoing scene is merely used as an example for description, which is not specifically limited in the embodiments of this application. The user may alternatively control the virtual object to perform adversarial interaction with other virtual objects through a virtual item. The virtual item may be a throwing virtual item such as grenades, cluster mines, and sticky grenades, or a shooting virtual item such as machine guns, pistols, and rifles. The type of the virtual item is not specifically limited in this application.

5) Scene data: It represents various features of an object in a virtual scene during interaction, for example, scene data may include a position of the object in the virtual scene. Certainly, different types of features may be included according to the type of the virtual scene. For example, in a virtual scene of a game, scene data may include waiting times for various functions configured in the virtual scene (depending on a quantity of times a same function can be used in a specific time), and may further represent attribute values of various states of a game character, such as a hit point value (also referred to as a red value), and a magic value (also referred to as a blue value).

For example, in a shooting game of a mobile terminal, a user may control a virtual object to enter with two weapons before starting the game, and then kill an enemy during the game. The killed person may drop a currently used weapon. The virtual object controlled by the user may pick up the dropped weapon or other equipment. However, there is a problem with picking up weapons and equipment, that is, picking up items (virtual items) through walls may occur, that is, picking up items across obstacles.

To take full advantage of idle virtual items in a virtual scene, such as dropped virtual items, a function of picking up virtual items is provided in the related art. A virtual object controlled by a player can pick up idle virtual items in the virtual scene. Since a picking-up operation is implemented by binding a collision box in the related art, there can be pick-ups that violate physical laws (for example, picking through walls), which may affect the accuracy of human-computer interaction in the virtual scene, thereby affecting the use experience.

The problems related to picking up virtual items are caused mainly because picking up of an item is achieved by triggering a collision box. Since a collision box is bound to a dropped item, and a dropping position may cause the collision box to pass through obstacles such as walls, a player may pick up the item through a wall.

Embodiments of this application provide a method and an apparatus for interaction processing of a virtual item, an electronic device, and a computer-readable storage medium, which can implement accurate picking in accordance with physical laws in virtual scenes. The following describes applications of the electronic device provided in the embodiments of this application. The electronic device provided in the embodiments of this application may be implemented as various types of user terminals such as a notebook computer, a tablet computer, a desktop computer, a set-top box or a mobile device (for example, a mobile phone, a portable music player, a personal digital assistant (PDA), a dedicated messaging device, a portable game device, an in-vehicle terminal, or a smart TV), or may be implemented as a server. An application in which the device is implemented as a terminal is described below.

For ease of understanding the method for interaction processing of a virtual item provided in the embodiments of this application more, one embodiment of the method for interaction processing of a virtual item provided in the embodiments of this application is described first. A virtual scene may be outputted completely based on the terminal or based on the terminal and the server in collaboration.

In some embodiments, the virtual scene may be a picture displayed in a game simulation. In the virtual scene, a user may simulate a battle, a strategy, or tactics through virtual objects belonging to different teams, which has a great guiding role in the command of battle game operations.

In some embodiments, the virtual scene may be an environment for game characters to interact, which may be, for example, used for game characters to fight in the virtual scene. Actions of virtual objects are controlled to perform interaction between two parties in the virtual scene, so that the user can relieve the stress of life during the game.

In one embodiment, FIG. 1A is a schematic diagram of an application mode of a method for interaction processing of a virtual item according to an embodiment of this application. The method is suitable for an application mode in which related data calculations of a virtual scene 100 can be completed completely relying on a computing power of a terminal 400, for example, a game in a stand-alone version/offline mode. The output of the virtual scene is completed through the terminal 400 such as a smartphone, a tablet computer, or a virtual reality/augmented reality device.

When visual perception of the virtual scene 100 is formed, the terminal 400 calculates data required for display through graphics computing hardware, completes the loading, parsing, and rendering of the display data, and outputs video frames capable of forming the visual perception of the virtual scene on the graphics output hardware, for example, displaying two-dimensional video frames on a display screen of a smartphone, or projecting video frames that implement three-dimensional display effects on lenses of augmented reality/virtual reality glasses. In addition, to enrich the perception effect, the device may further form one or more of auditory perception, tactile perception, motion perception, or taste perception by using different hardware.

In an example, the terminal 400 runs a client 410 (for example, a stand-alone game application), and outputs a virtual scene including role playing during the running of the client 410. The virtual scene is an environment for game characters to interact, such as plains, streets, or valleys for game characters to fight. The virtual scene includes a first virtual object 110 and a virtual item 120. The first virtual object 110 may be a game character controlled by a user (or a player), that is, the first virtual object 110 is controlled by a real user and moves in the virtual scene in response to an operation of the real user for a controller (including a touch screen, a voice-activated switch, a keyboard, a mouse, a joystick, and the like). For example, when the real user moves the joystick to the left, the first virtual object moves to the left in the virtual scene, and may further stay still, jump, and use various functions (for example, skills and items). The virtual item 120 may be a battle tool used by the first virtual object 110 in the virtual scene. For example, the first virtual object 110 may pick up the virtual item 120 in the virtual scene, to use a function of the virtual item 120 for a game battle.

For example, when the user controls the first virtual object 110 to move to the virtual item 120 (that is, an idle virtual item) in the virtual scene through the client 410, and the virtual item 120 is located in a direction consistent with an orientation of the first virtual object 110, and there is no obstacle between the virtual item and the first virtual object 110, the user controls the first virtual object 110 to pick up the virtual item 120 in the virtual scene through the client 410.

In some embodiments, when the first virtual object 110 is facing the idle virtual item, such as the virtual item 120, the idle virtual item may be considered to be in the direction consistent with the orientation of the first virtual objection 110. In addition, if the idle virtual item, such as the virtual item 120, is within a reasonable viewing angle of the first virtual object 110, such as being in a 120 degree Field of View of the first virtual object 110, the idle virtual item may be considered to be in the direction consistent with the orientation of the first virtual objection 110. Depending on the specific requirements in different scenarios, the orientation of the first virtual object 110 may be defined as any reasonable angel of the field of the view of the first virtual object 110. That is, the orientation of the first virtual object 110 may be defined as more or less than the 120 degree Field of View of the first virtual object 110.

In some embodiments, the first virtual objection 110 may also be equipped with a virtual item. When the equipped virtual item of the first virtual object 110 faces the idle virtual item, such as the virtual item 120, the idle virtual item may also be considered to be in the direction consistent with the orientation of the first virtual objection 110. The orientation of the equipped virtual item of the first virtual object 110 may refer to the direction the equipped virtual item is pointing to. The orientation of the equipped virtual item of the first virtual object 110 may also refer to the space located within a reasonable angle, such as a 60 degree angle or a 120 degree angle, centered around the axis of the pointing direction of the equipped virtual item. In some embodiments, the equipped virtual item of the first virtual object 110 may be considered as an integral part of the first virtual object 110. In some embodiments, depending on the use scenarios, the equipped virtual item of the first virtual object 110 may be considered as a separate item from the first virtual object 110.

Figure 1B:
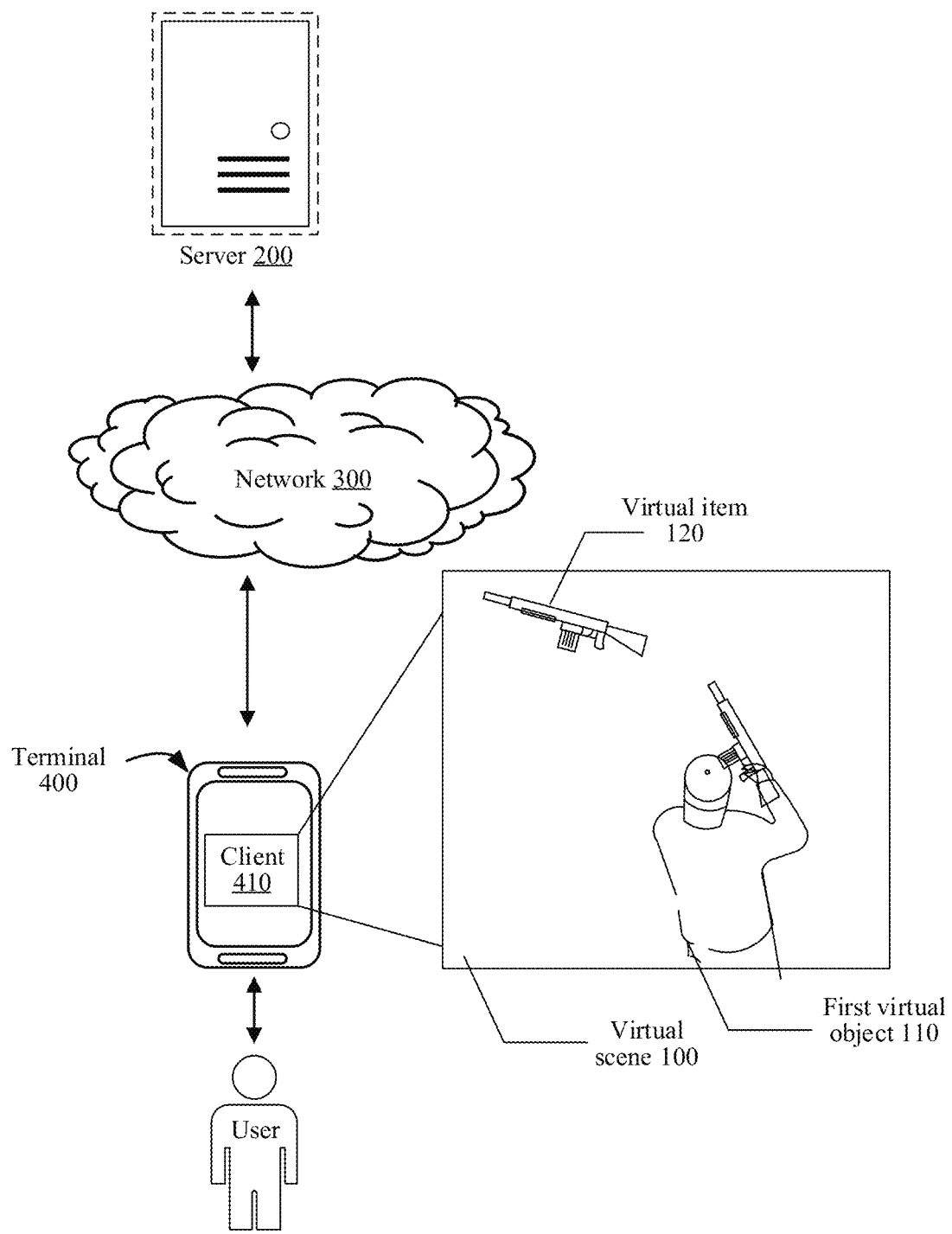

In another embodiment, FIG. 1B is a schematic diagram of an application mode of a method for interaction processing of a virtual item according to an embodiment of this application. The method is applied to the terminal 400 and a server 200, and is suitable for an application mode of relying on the computing power of the server 200 to complete virtual scene calculation and outputting the virtual scene at the terminal 400.

Taking formation of the visual perception of the virtual scene 100 as an example, the server 200 calculates relevant display data of the virtual scene and sends the data to the terminal 400. The terminal 400 relies on the graphics computing hardware to completes the loading, parsing, and rendering of the display data, and relies on graphics output hardware to output the virtual scene to form the visual perception. For example, two-dimensional video frames may be displayed on a display screen of a smartphone, or video frames that implement three-dimensional display effects may be projected on lenses of augmented reality/virtual reality glasses. For the form of the perception of the virtual scene, it may be understood that the corresponding hardware output of the terminal may be used, for example, a microphone is used to output and form the auditory perception, and a vibrator is used to output and form the tactile perception.

In an example, the terminal 400 runs the client 410 (for example, a game application of an online version), and interacts with other users by connecting to a game server (that is, the server 200). The terminal 400 outputs a virtual scene 100 of the client 410, which includes the first virtual object 110 and the virtual item 120. The first virtual object 110 may be a game character controlled by a user, that is, the first virtual object 110 is controlled by a real user and moves in the virtual scene in response to an operation of the real user for a controller (including a touch screen, a voice-activated switch, a keyboard, a mouse, a joystick, and the like). For example, when the real user moves the joystick to the left, the first virtual object moves to the left in the virtual scene, and may further stay still, jump, and use various functions (for example, skills and items). The virtual item 120 may be a battle tool used by the first virtual object 110 in the virtual scene. For example, the first virtual object 110 may pick up the virtual item 120 in the virtual scene, to use a function of the virtual item 120 for a game battle.

For example, when the user controls the first virtual object 110 to move to a virtual item 120 (that is, an idle virtual item) in the virtual scene through the client 410, the client 410 sends location information of the first virtual object 110 to the server 200 through a network 300. The server 200 performs obstacle detection on the virtual item 120 and the first virtual object 110 according to a pick-up logic. When the virtual item 120 is located in the direction of the equipped virtual item of the first virtual object 110, and there is no obstacle between the virtual item and the equipped virtual item of the first virtual object, a pickable prompt of the virtual item 120 is sent to the client 410. The client 410 displays the pickable prompt of the virtual item 120 after receiving the pickable prompt of the virtual item 120. The user controls the first virtual object 110 to pick up the virtual item 120 in the virtual scene based on the pickable prompt of the virtual item 120.

In some embodiments, the terminal 400 may implement the method for interaction processing of a virtual item provided in the embodiments of this application by running a computer program. For example, the computer program may be a native program or a software module in an operating system; may be a native application (APP), that is, a program that needs to be installed in the operating system to run, such as a game APP (that is, the foregoing client 410); may be an applet, that is, a program that may be run only by downloading the applet into a browser environment; or may be a game applet that can be embedded into any APP. In summary, the foregoing computer program may be an application, a module, or a plugin in any form.

The embodiments of this application can be implemented by using a cloud technology. The cloud technology is a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources.

In an example, the server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 400 and the server 200 may be directly or indirectly connected in a wired or wireless communication manner. This is not limited in the embodiments of this application.

Figure 2A:
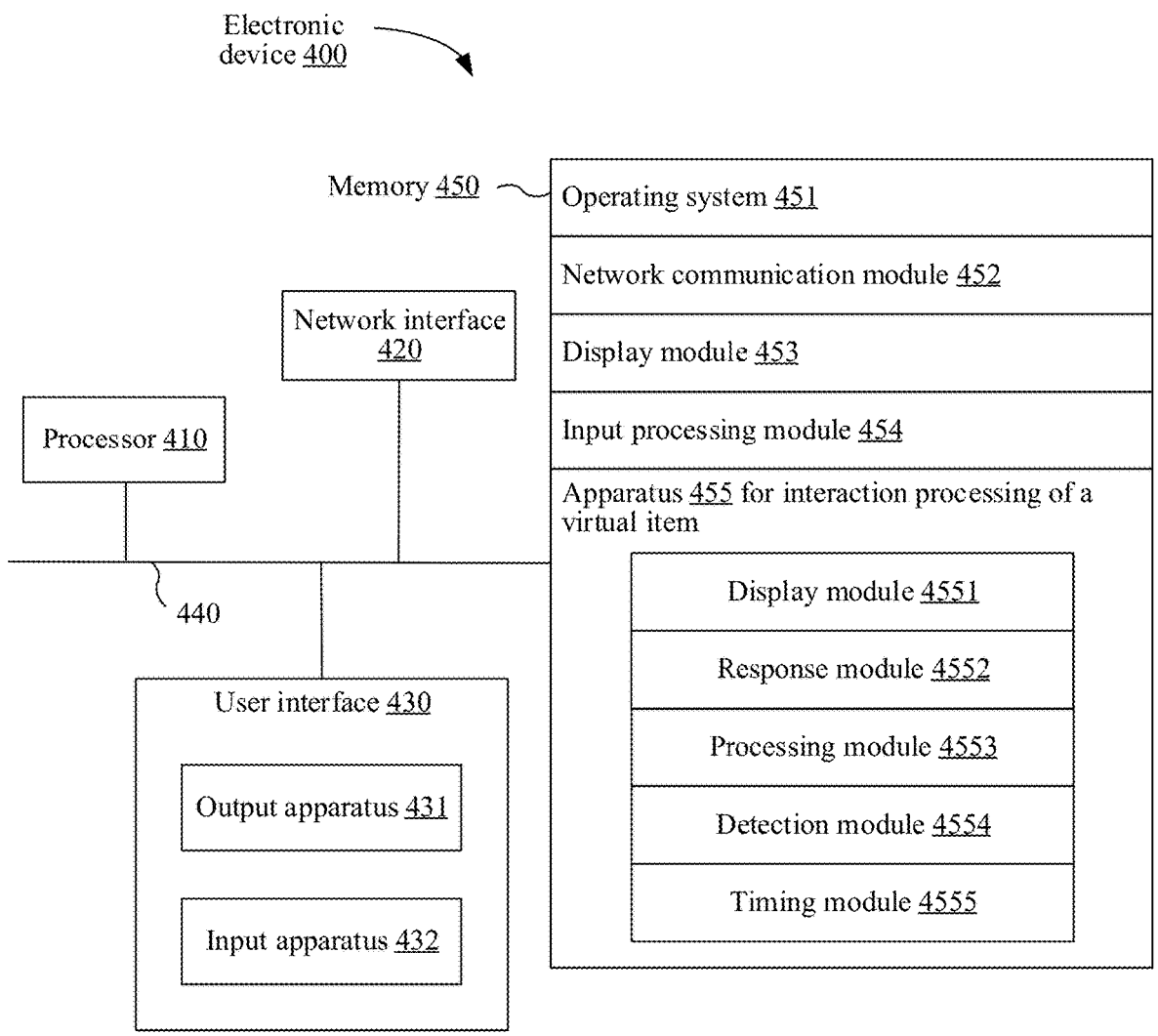
FIG. 2A is a schematic structural diagram of an electronic device for interaction processing of a virtual item according to an embodiment of this application.

FIG. 2A is a schematic structural diagram of an electronic device for interaction processing of a virtual item according to an embodiment of this application. In an example where the electronic device is a terminal, the electronic device shown in FIG. 2A includes at least one processor 410, a memory 450, at least one network interface 420, and a user interface 430. All the components in the electronic device 400 are coupled together by using a bus system 440. It may be understood that the bus system 440 is configured to implement connection and communication between the components. In addition to a data bus, the bus system 440 further includes a power bus, a control bus, and a status signal bus. However, for clear description, various types of buses in FIG. 2A are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor or the like.

The user interface 430 includes one or more output apparatuses 431 that can display media content, including one or more speakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Hardware devices include a solid-state memory, a hard disk drive, an optical disc driver, or the like. The memory 450 includes, for example, one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this application is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Network interfaces 420 include: Bluetooth, wireless compatible authentication (WiFi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, an apparatus for interaction processing of a virtual item provided in the embodiments of this application may be implemented by using software. FIG. 2A shows an apparatus 455 for interaction processing of a virtual item stored in the memory 450. The apparatus may be software in a form such as a program and a plugin, and includes the following software modules: a display module 4551, a response module 4552, a processing module 4553, a detection module 4554, and a timing module 4555. These modules are logical modules, and may be randomly combined or further divided based on a function to be performed. Functions of the modules are described below.

Figure 2B:
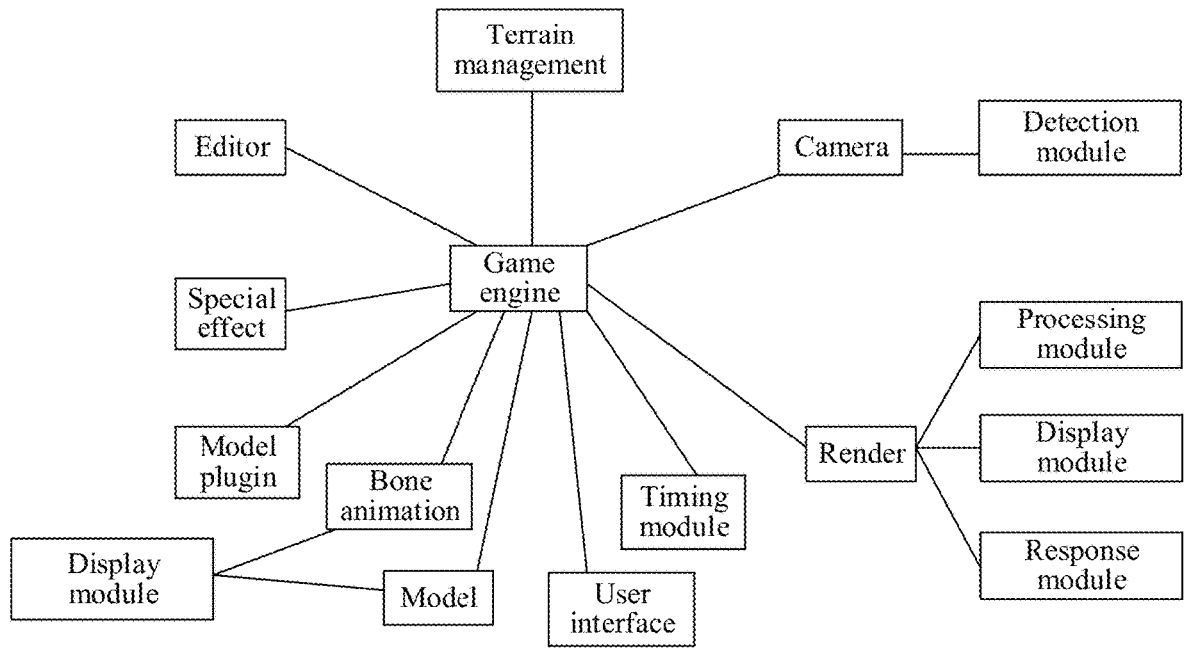
FIG. 2B is a schematic diagram of a human-computer interaction engine installed in an apparatus for interaction processing of a virtual item according to an embodiment of this application.

FIG. 2B is a schematic diagram of a human-computer interaction engine installed in an apparatus for interaction processing of a virtual item according to an embodiment of this application. In an example where the human-computer interaction engine is applied to a game, the human-computer interaction engine is also referred to as a game engine. The game engine refers to some editable computer game systems that have already been compiled, or some core assemblies of an interactive real-time image applications, and provides various tools required by a game designer to compile a game. An objective of the game engine is to enable the game designer to easily and quickly make a game program without a need to start from scratch. Game engines include rendering engines (that is, "renderers", including two-dimensional image engines and three-dimensional image engines), physics engines, obstacle detection systems, sound effects, scripting engines, computer animation, artificial intelligence, network engines, and scene management. A game engine is a set of codes (instructions) that is designed for a machine running a game of a specific type and that can be recognized by the machine. The game engine is like an engine and controls the operation of the game. A game program may be divided into two parts of a game engine and game resources. The game resources include images, sounds, animations, and the like, that is, Game=engine (program code)+resources (images, sounds, animations, and the like). The game engine then calls the resources sequentially according to the requirements of the game design.

The method for interaction processing of a virtual item provided in the embodiments of this application is implemented by each module in the apparatus for interaction processing of a virtual item shown in FIG. 2A by calling the relevant components of the human-computer interaction engine shown in FIG. 2B. An exemplary description is given below.

For example, the display module 4551 is configured to display at least one idle virtual item in a virtual scene. The display module 4551 calls the user interface part in the game engine shown in FIG. 2B to realize the interaction between the user and the game, calls the model part in the game engine to make a two-dimensional or three-dimensional model, assigns material maps to the model according to different faces through the skeletal animation part after the model is made, which is equivalent to covering the bones with skin, and finally calculates all effects such as the model, animation, light and shadow, and special effects in real time through the rendering part and displays the effects on a human-computer interface.

For example, the response module 4552 is configured to display, in response to a movement operation of controlling a first virtual object, a movement process of the first virtual object in the virtual scene. The response module 4552 calls a rendering module in FIG. 2B to perform a real-time image calculation based on a calculated movement trajectory and displays the movement trajectory on the human-computer interface.

For example, the processing module 4553 displays a pickable prompt of the idle virtual item when the idle virtual item is located in a direction consistent with an orientation of a equipped virtual item of the first virtual object and there is no obstacle between the idle virtual item and the equipped virtual item of the first virtual object. The processing module 4553 calls the rendering module in the game engine shown in FIG. 2B, and renders, when there is no obstacle between the idle virtual item and the equipped virtual item of the first virtual object, the idle virtual item through the rendering module and displays the idle virtual item on the human-computer interaction interface.

For example, the detection module 4554 is configured to detect a distance between the first virtual object and the idle virtual item during the movement; and perform obstacle detection between the equipped virtual item of the first virtual object and the idle virtual item when the distance is less than a distance threshold. The detection module 4554 calls a camera part of the game engine shown in FIG. 2B to implement obstacle detection, and specifically performs obstacle detection through a detection ray emitted by a camera bound on the equipped virtual item of the first virtual object, where the camera bound on the equipped virtual item of the first virtual object is configured through the camera part.

For example, the timing module 4555 is configured to bind a timer on the idle virtual item. When the idle virtual item is not picked up within a set time period, the timing module 4555 calls the rendering module in the game engine shown in FIG. 2B, and renders the idle virtual item through the rendering module, to cancel the display of the idle virtual item in the virtual scene.

Figure 3A:
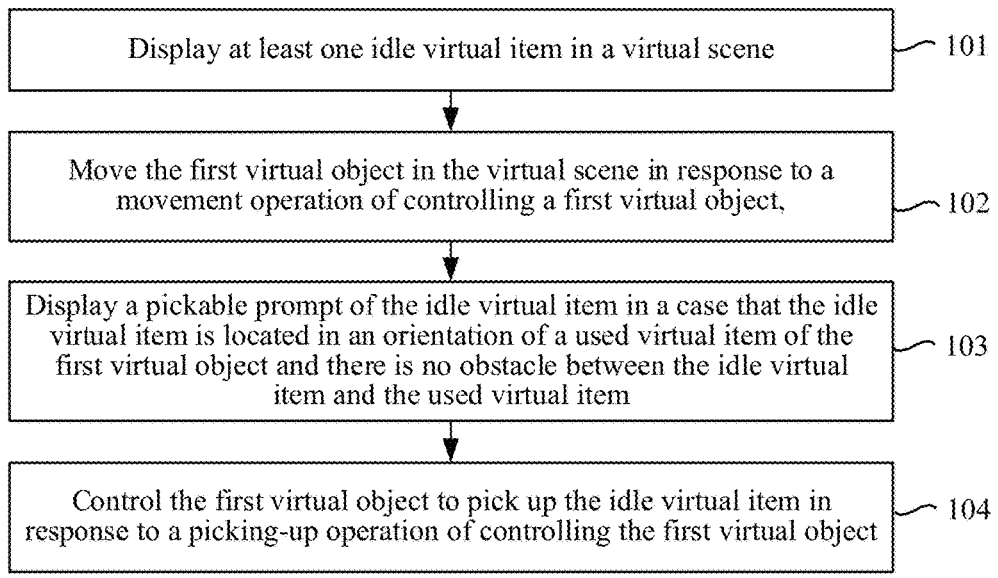
FIG. 3A to FIG. 3C are schematic flowcharts of a method for interaction processing of a virtual item according to an embodiment of this application.

As described above, the method for interaction processing of a virtual item provided in the embodiments of this application may be implemented by various types of electronic devices, such as terminals. FIG. 3A is a schematic flowchart of a method for interaction processing of a virtual item according to an embodiment of this application. A description is made with reference to steps shown in FIG. 3A.

In the following steps, idle virtual items refer to idle and unequipped virtual item of the first virtual objects, including virtual items initialized in the virtual scene (that is, virtual items that have not been used by any virtual objects) and dropped virtual items (for example, if a virtual object is killed, virtual items held by the virtual object drop at a killed position for other virtual objects to pick up).

Step 101: Display at least one idle virtual item in a virtual scene.

For example, at the beginning of a game, virtual items in the virtual scene are initialized, and the virtual items may be randomly set in various positions of the virtual scene. The positions of the initialized virtual items in each game may be set to be the same. The positions of the initialized virtual items in each game may be set to be different (to increase the difficulty of the game, so that the user cannot predict a position of a virtual items). After the virtual items are initialized, the initialized virtual items (idle virtual items) may be displayed in the virtual scene. A virtual object controlled by the user may pick up the initialized virtual items to attack or defend through the picked-up virtual items.

In some embodiments, the displaying at least one idle virtual item in a virtual scene includes: using, when a second virtual object is attacked in the virtual scene and loses a capability of a held virtual item, the held virtual item as an idle virtual item; and displaying at least one virtual item dropped by the second virtual object at a position where the second virtual object is attacked.

The idle virtual items include virtual items dropped by virtual objects. For example, during a game, a second virtual object (a virtual object other than the first virtual object, such as an enemy or a teammate of the first virtual object) is attacked in the virtual scene and loses capabilities of held virtual items, for example, a third virtual object (a virtual object other than the second virtual object) kills the second virtual object, the second virtual object is killed by the third virtual object; or the third virtual object hits the second virtual object hard, and the second virtual object is injured, the virtual items held by the second virtual object drop at a position where the second virtual object is attacked. Therefore, at the position where the second virtual object is attacked, at least one virtual item dropped by the second virtual object is displayed for picking up by virtual objects other than the second virtual object, especially the third virtual object that attacks the second virtual object, where the dropped virtual item serves as a reward for the third virtual object.

In some embodiments, the displaying at least one idle virtual item in a virtual scene includes: using, when a second virtual object actively discards at least one held virtual item in the virtual scene, the held virtual item as an idle virtual item; and display the at least one actively discarded virtual item at a position where the second virtual object discards the held virtual item.

The idle virtual items include virtual items discarded by virtual objects. For example, during the game, when a virtual object can only hold a fixed quantity of virtual items, in order to hold enough useful virtual items, the virtual object may choose to actively discard held virtual items. For example, when a second virtual object (a virtual object other than the first virtual object, such as an enemy or a teammate of the first virtual object) does not want held items with too low performance, the second virtual object may choose to actively discard at least one held virtual item. Therefore, the virtual item held by the second virtual object drops at a discarding position, and the discarded held virtual item is regarded as an idle virtual item. Therefore, at the position where the second virtual object discards the held virtual item, at least one virtual item that is actively discarded is displayed for virtual objects other than the second virtual object to pick up, and the second virtual object may pick up other virtual items.

In some embodiments, the displaying at least one idle virtual item in a virtual scene includes: using, when a teammate of the first virtual object places at least one held virtual item at a placement position in the virtual scene, the held virtual item as an idle virtual item, where the idle virtual item is configured to be picked up by the first virtual object; and displaying the at least one idle virtual item placed by the teammate at the placement position in a map of the virtual scene.

The idle virtual items include virtual items placed by virtual objects. For example, during the game, to achieve teamwork, when a virtual object wants to give a held virtual object to a teammate, the virtual object may choose to place the held virtual item somewhere in the virtual scene for the teammate to pick up.

Figure 4:
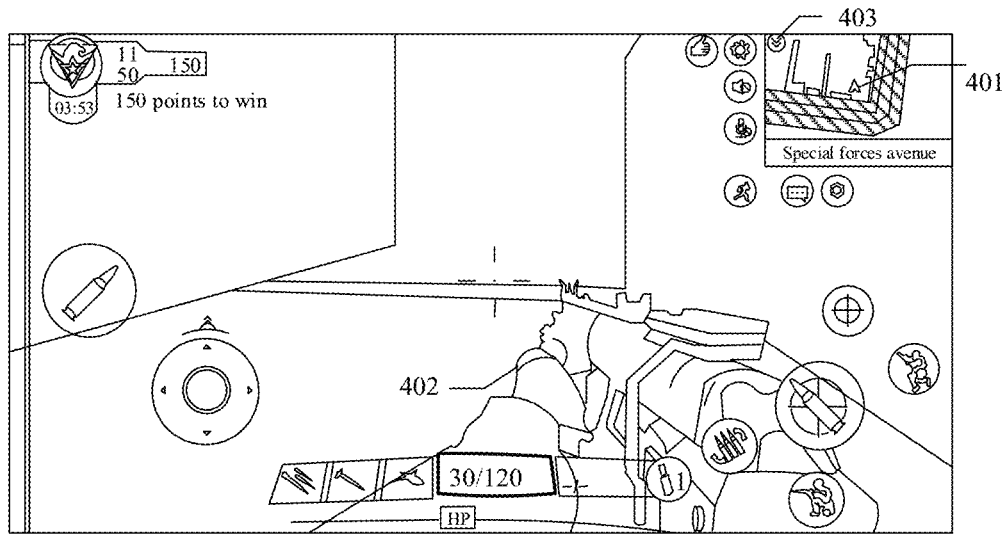
FIG. 4 is a schematic flowchart of an interface of a method for interaction processing of a virtual item according to an embodiment of this application.

For example, FIG. 4 is a schematic flowchart of an interface of a method for interaction processing of a virtual item according to an embodiment of this application. A fourth virtual object (a teammate of the first virtual object) places at least one held virtual item at a placement position 401 of the virtual scene. The held virtual item is used as an idle virtual item, and the idle virtual item is used for the first virtual object 402 and any virtual object of the same team to pick up. The idle virtual item is displayed at the placement position 401 in a map 403 (a guide map formed by abbreviating the virtual scene of the entire game) of the virtual scene, so that the first virtual object and any virtual object of the same team can check, through the map 403 of the virtual scene, where the fourth virtual object places the virtual item, thereby quickly arriving at the placement position to pick up the virtual item.

Step 102: Control, in response to a movement operation of controlling a first virtual object, the first virtual object to move in the virtual scene.

The first virtual object may be an object controlled by a user in a game simulation. Certainly, the virtual scene may further include other virtual objects, which may be controlled by other users or by robot programs. The virtual objects may be divided into a plurality of teams, the teams may be in an adversarial relationship or a cooperative relationship, and the teams in the virtual scene may include one or all of the foregoing relationships.

The movement operation of controlling the first virtual object by the user may control the first virtual object to move, flip, jump, and the like in the virtual scene. The movement operation of the first virtual object is received through the human-computer interaction interface, thereby controlling the first virtual object to move in the virtual scene. During the movement, content displayed in the human-computer interaction interface changes along with the movement of the first virtual object.

When the movement process of the first virtual object in the virtual scene is displayed on the human-computer interaction interface, a field of view region of a viewing object is determined according to a viewing position and a field of view of the viewing user in the complete virtual scene, and a partial virtual scene in the field of view region in the virtual scene is displayed. That is, the displayed virtual scene may be a partial virtual scene relative to the panoramic virtual scene.

Figure 5A:
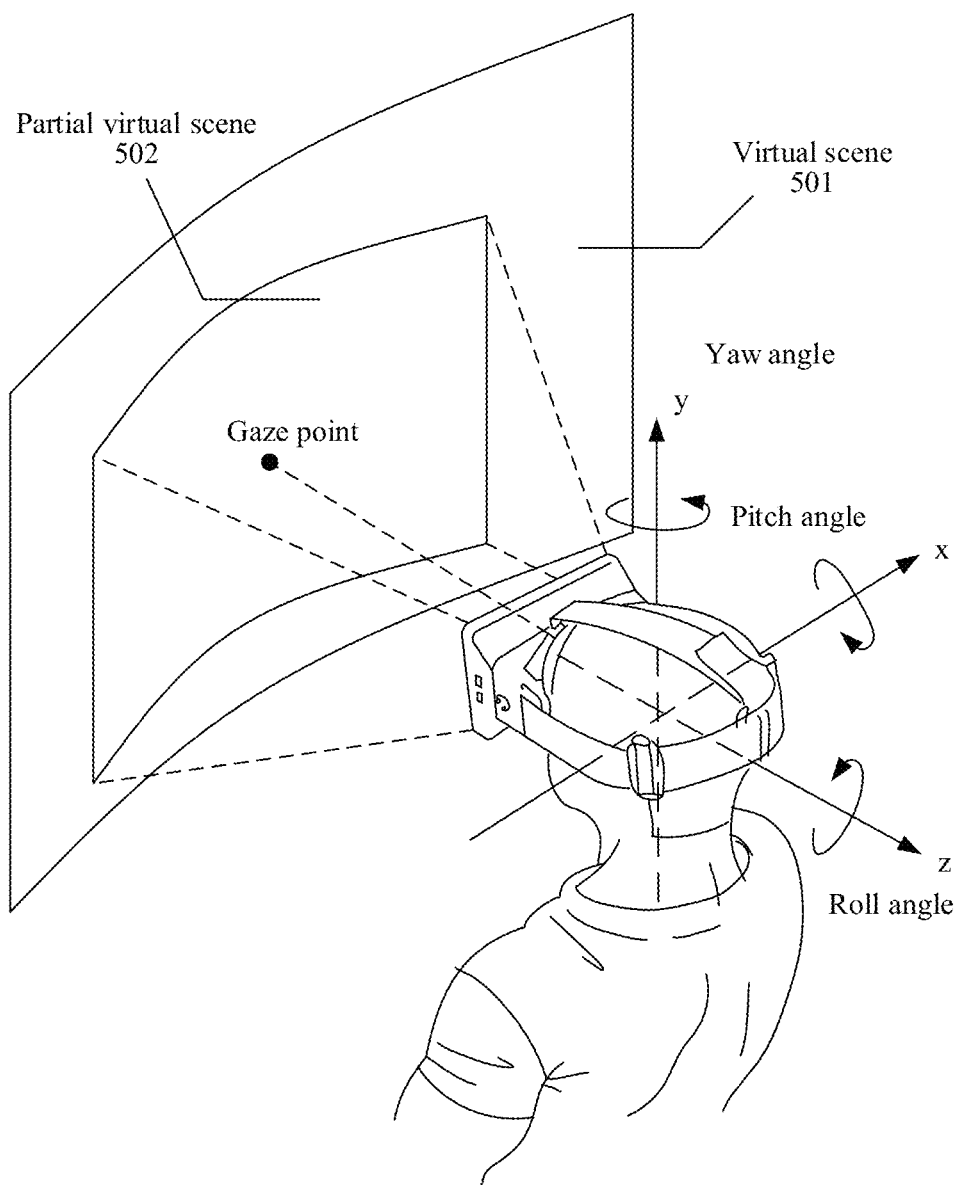
FIG. 5A and FIG. 5B are schematic diagrams of interfaces of virtual reality according to an embodiment of this application.

For example, taking a user wearing a virtual reality device as an example, FIG. 5A is a schematic diagram of an interface of virtual reality according to an embodiment of this application. A viewing user (that is, a real user) may perceive a partial virtual scene 502 located in the field of view region in a virtual scene 501 through a lens in a virtual reality device. A sensor (for example, a nine-axis sensor) for posture detection is arranged in the virtual reality device, which is configured to detect a posture change of the virtual reality device in real time. If the user wears the virtual reality device, when a posture of the head of the user changes, the real-time posture of the head is transmitted to the processor to calculate a gaze point of the line of sight of the user in the virtual scene. According to the gaze point, an image in a three-dimensional model of the virtual scene in a gaze range of the user (that is, the field of view region) is calculated and displayed on the display screen, providing the user with immersive experience like viewing in a real environment. For other types of virtual reality devices such as mobile virtual reality devices (PCVR), the principle of realizing visual perception is similar to the above, and the difference is that the PCVR, the mobile virtual reality device, and the like do not have integrated processors for related computing, and do not have independent virtual reality input and output capabilities.

Figure 5B:
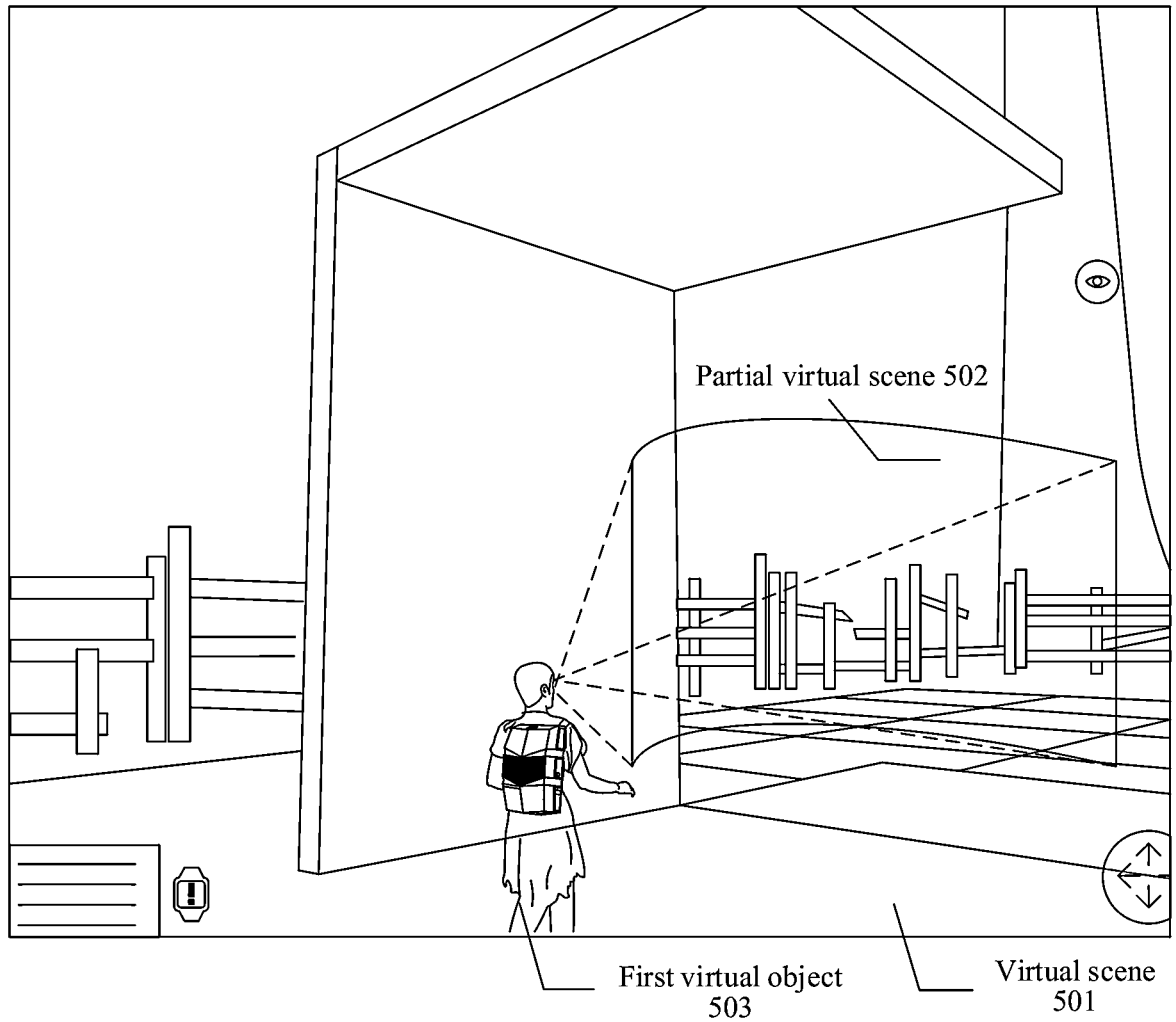

Take the user controlling a first virtual object 503 in the virtual scene as an example, that is, the viewing user is the first virtual object 503, FIG. 5B is a schematic diagram of an interface of virtual reality according to an embodiment of this application. The user controls a viewing position and a field of view of the first virtual object 503 in the complete virtual scene 501, controls the first virtual object 503 to perform movement operations, such as running and squatting, and displays a movement process of the first virtual object 503 in the virtual scene.

Step 103: Display a pickable prompt of the idle virtual item when the idle virtual item is located in a direction consistent with an orientation of a equipped virtual item of the first virtual object and there is no obstacle between the idle virtual item and the equipped virtual item of the first virtual object.

In embodiments of this application, due to a loophole in the pick-up logic, virtual objects can automatically pick up virtual items that are not to be picked up across obstacles. For example, when an idle virtual item is separated from the first virtual object by a wall, the first virtual object can still automatically pick up the idle virtual item.

To correct the loophole of the pick-up logic, whether there is an obstacle between the idle virtual item and the equipped virtual item of the first virtual object may be detected. When the idle virtual item is located in a direction consistent with the orientation of the equipped virtual item of the first virtual object and there is an obstacle between the idle virtual item and the equipped virtual item of the first virtual object, it means that the first virtual object faces the obstacle and cannot pick up the obstacle. That is, the idle virtual item and the equipped virtual item of the first virtual object are positioned along the same direction from the perspective of the first virtual object. A non-pickable prompt of the idle virtual item is then displayed in the virtual scene to remind that the obstacle needs to be bypassed to pick up the idle virtual item. When the idle virtual item is located in a direction consistent with an orientation of a equipped virtual item of the first virtual object and there is no obstacle between the idle virtual item and the equipped virtual item of the first virtual object, it means that the first virtual object faces the idle virtual item and can normally pick up the obstacle. A pickable prompt of the idle virtual item is displayed in the virtual scene to prompt that the idle virtual item can be picked up.

Figure 3B:
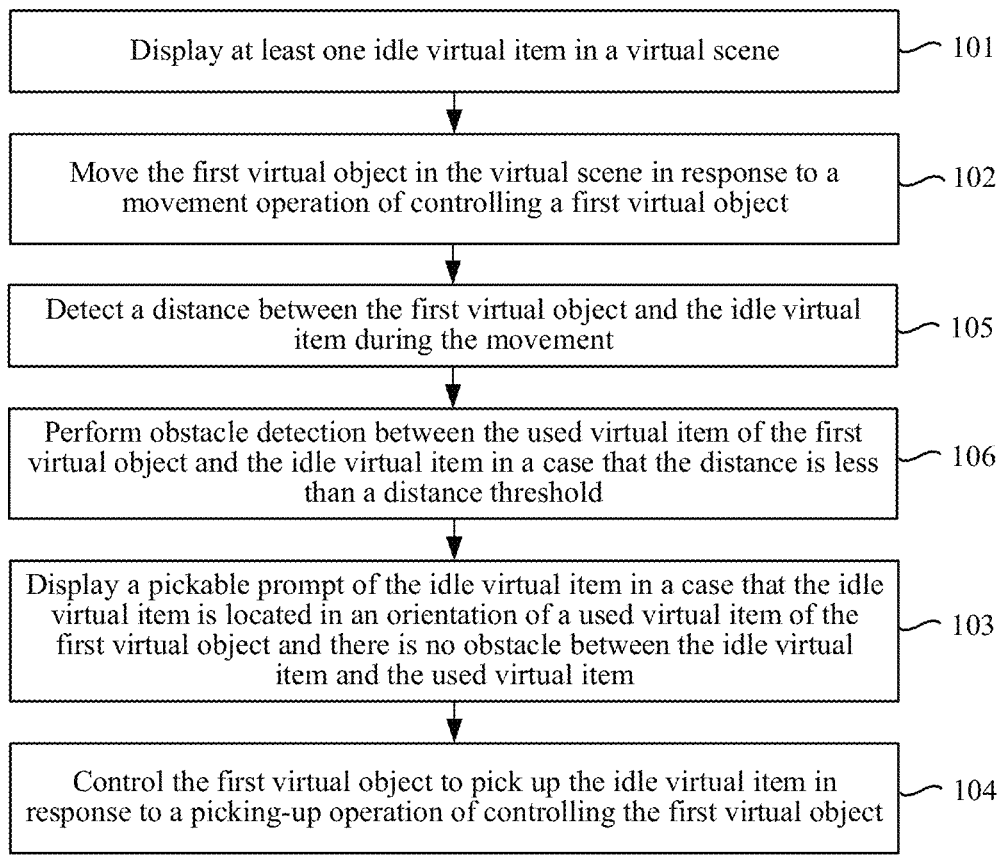

FIG. 3B is a schematic flowchart of a method for interaction processing of a virtual item according to an embodiment of the present invention. FIG. 3B shows that FIG. 3A further includes steps 105 and 106. Step 105: Detect a distance between the first virtual object and the idle virtual item during the movement. Step 106: Perform obstacle detection between the equipped virtual item of the first virtual object and the idle virtual item when the distance is less than a distance threshold.

For example, to correct the loophole of the pick-up logic, the distance between the first virtual object and the idle virtual item during the movement may be detected first. For example, first coordinates of the first virtual object in the virtual scene and second coordinates of the idle virtual item in the virtual scene are determined, to determine the distance between the first virtual object and the idle virtual item during the movement according to a distance between the first coordinates and the second coordinates. When the distance is less than the distance threshold, it means that the first virtual object is relatively close to the idle virtual item, and is capable of picking up the idle virtual item. Whether there is an obstacle between the equipped virtual item of the first virtual object and the idle virtual item is then detected. When an obstacle is detected between the idle virtual item and the equipped virtual item of the first virtual object, it means that the first virtual object faces the obstacle, and even if the first virtual object is close enough to the idle virtual item, the obstacle cannot be picked up.

In some embodiments, before the pickable prompt of the idle virtual item is displayed, obstacle detection is performed between the equipped virtual item of the first virtual object and the idle virtual item based on each real-time position of the first virtual object during the movement.

For example, to correct the loophole of the pick-up logic, obstacle detection may be performed between the equipped virtual item of the first virtual object and the idle virtual item based on each real-time position of the first virtual object during the movement. When it is detected that there is an obstacle between the idle virtual item and the equipped virtual item of the first virtual object, it means that there is an obstacle in front of the first virtual object, and the obstacle cannot be picked up.

In some embodiments, the performing obstacle detection between the equipped virtual item of the first virtual object and the idle virtual item includes: emitting a detection ray at a position of the equipped virtual item of the first virtual object by using a camera component bound on the equipped virtual item of the first virtual object, where an orientation of the detection ray is consistent with the orientation of the equipped virtual item of the first virtual object; and determining whether there is an obstacle between the equipped virtual item of the first virtual object and the idle virtual item based on the detection ray.

For example, through the camera component on the equipped virtual item of the first virtual object, the detection ray with an orientation consistent with that of the equipped virtual item of the first virtual object is emitted from the position of the equipped virtual item of the first virtual object, and whether there is an obstacle between the equipped virtual item of the first virtual object and the idle virtual item is determined through the detection ray, that is, whether there is an obstacle between the first virtual object and the idle virtual item. When the detection ray intersects with a collider component (for example, a collision box or a collision ball) bound on the obstacle (for example, a wall or an oil barrel) that hinders the movement of the virtual object, it means that there is an obstacle between the equipped virtual item of the first virtual object and the idle virtual item, that is, there is an obstacle between the first virtual object and the idle virtual item. When the detection ray does not intersect with the collider component bound on the obstacle, it means that the obstacle does not exist between the equipped virtual item of the first virtual object and the idle virtual item, that is, the obstacle does not exist between the first virtual object and the idle virtual item In addition, a detection ray is emitted at a position of the equipped virtual item of the first virtual object by using a camera component bound on the equipped virtual item of the first virtual object. An end point of the detection ray is the position of the idle virtual item. Based on the detection ray, it is determined whether there is an obstacle between the equipped virtual item of the first virtual object and the idle virtual item. For example, if the detection ray transmits an obstacle, it means that there is an obstacle between the first virtual object and the idle virtual item. If the detection ray does not transmit an obstacle, it means that there is no obstacle between the first virtual object and the idle virtual item.

In some embodiments, the displaying a pickable prompt of the idle virtual item when the idle virtual item is located in a direction consistent with an orientation of a equipped virtual item of the first virtual object and there is no obstacle between the idle virtual item and the equipped virtual item of the first virtual object includes: displaying, when a plurality of idle virtual items are located in the orientation of the equipped virtual item of the first virtual object and there is no obstacle between the plurality of idle virtual items and the equipped virtual item of the first virtual object, pickable prompts of some of the plurality of idle virtual items.

Figure 6:
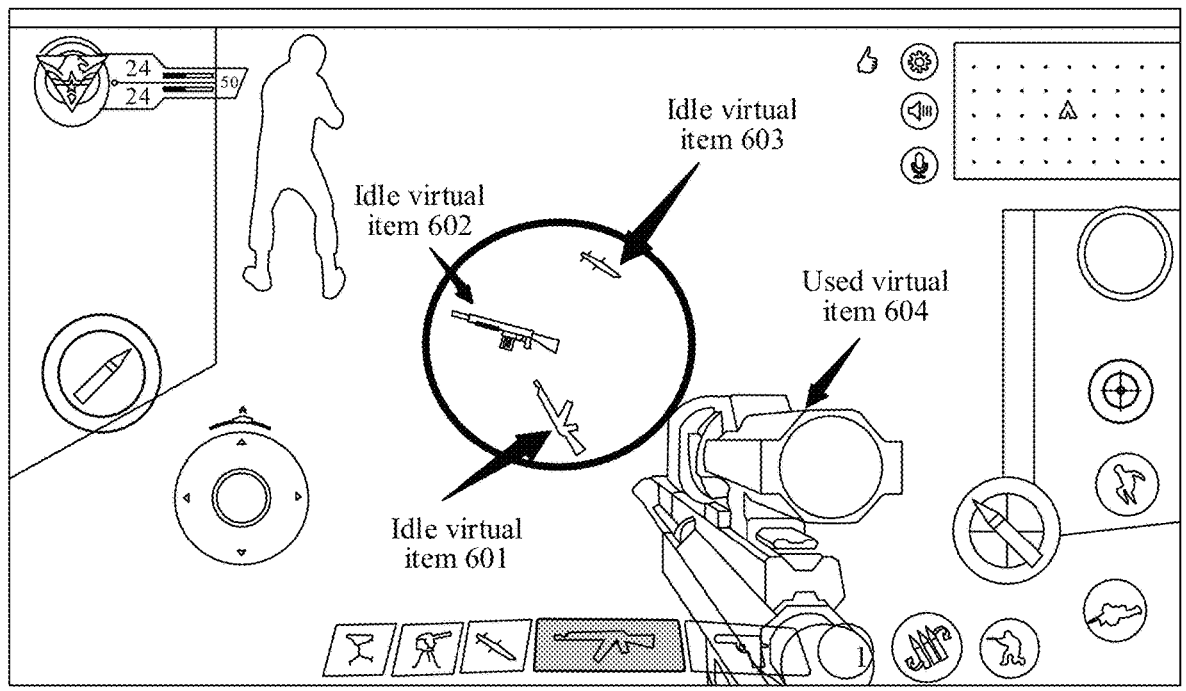
FIG. 6 is a schematic diagram of an interface of a plurality of idle virtual items according to an embodiment of this application.

For example, FIG. 6 is a schematic diagram of an interface of a plurality of idle virtual items according to an embodiment of this application. In a virtual scene, an idle virtual item 601, an idle virtual item 602, and an idle virtual item 603 are all located in a direction consistent with an orientation of a equipped virtual item of the first virtual object 604 of a first virtual object and there is no obstacle between the idle virtual items and the equipped virtual item of the first virtual object 604. Pickable prompts of some of the idle virtual items are displayed in the virtual scene, for example, a pickable control of the idle virtual item 601 is displayed.

Figure 3C:
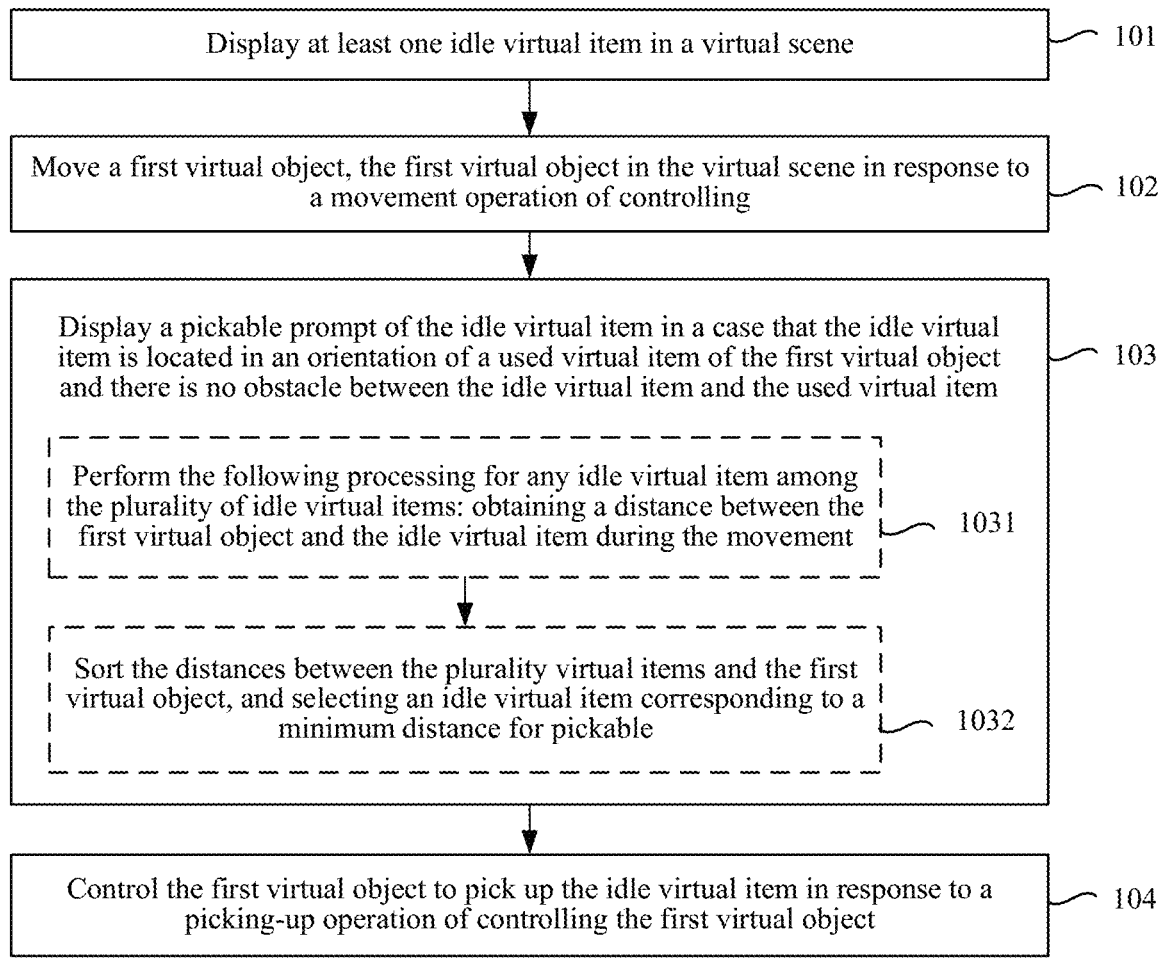

FIG. 3C is a schematic flowchart of a method for interaction processing of a virtual item according to an embodiment of the present invention. FIG. 3C shows that step 103 in FIG. 3A may be implemented through steps 1031 and 1032: Step 1031: Perform the following processing for any idle virtual item among the plurality of idle virtual items: obtaining a distance between the first virtual object and the idle virtual item during the movement. Step 1032: Sort the distances between the plurality of idle virtual items and the first virtual object, and select an idle virtual item corresponding to a minimum distance for pickable prompting.

For example, referring to FIG. 6, among the idle virtual item 601, the idle virtual item 602, and the idle virtual item 603 in the virtual scene, the idle virtual item 601 is closest to the equipped virtual item of the first virtual object, that is, the idle virtual item 601 is closest to the first virtual object. A pickable prompt of the idle virtual item 601 is then displayed in the virtual scene, that is, a pickable control, indicating that the idle virtual item 601 can be picked up. According to distances between the first virtual object and the idle virtual items, an idle virtual item closest to the first virtual object is selected from the plurality of idle virtual items for pickable prompting, so that the first virtual object can pick up the idle virtual item at the fastest speed, to prevent the idle virtual item from being picked up by other virtual objects.

In some embodiments, the displaying pickable prompts of some of the plurality of idle virtual items includes: performing the following processing for any idle virtual item among the plurality of idle virtual items: obtaining, based on usage preference of the first virtual object for virtual items, a matching degree between the idle virtual item and the usage preference; and sorting the matching degrees between the plurality of idle virtual items and the usage preference, and selecting an idle virtual item corresponding to a highest matching degree for pickable prompting.

For example, referring to FIG. 6, when there are a plurality of idle virtual items in the virtual scene, such as the idle virtual item 601, the idle virtual item 602, and the idle virtual item 603, the usage preference of the first virtual object is predicted by using a neural network model according to virtual items used by the first virtual object in history, that is, the preference of the first virtual object for virtual items. Based on the usage preference of the first virtual object, a matching degree between the idle virtual item 601 and the usage preference is determined, a matching degree between the idle virtual item 602 and the usage preference is determined, and a matching degree between the idle virtual item 603 and the usage preference is determined. The idle virtual item 601 with the highest matching degree is selected from among the plurality of matching degrees for pickable prompting, so that the idle virtual item that the first virtual object likes the most is selected from the plurality of idle virtual items.

In some embodiments, the displaying pickable prompts of some of the plurality of idle virtual items includes: performing the following processing for any idle virtual item among the plurality of idle virtual items: obtaining a frequency that the idle virtual item is used by other virtual objects; and sorting the frequencies that the plurality of idle virtual items are used by other virtual objects, and selecting an idle virtual item corresponding to a maximum frequency for pickable prompting.

For example, referring to FIG. 6, among the idle virtual item 601, the idle virtual item 602, and the idle virtual item 603 in the virtual scene, the idle virtual item 601 is most frequently used by other virtual objects (virtual objects other than the first virtual object), that is, the idle virtual item 601 is often used by other virtual objects and has a high usage degree. A pickable prompt of the idle virtual item 601 is then displayed in the virtual scene, that is, a pickable control, indicating that the idle virtual item 601 can be picked up. According to usage degrees of the idle virtual items, the idle virtual item with the highest usage degree is selected from the plurality of idle virtual items for pickable prompting, indicating that the idle virtual item is easy to use and has specific use value. Therefore, the first virtual object picks up a valuable idle virtual item which is beneficial for the first virtual object to play the battle game.

In some embodiments, the displaying pickable prompts of some of the plurality of idle virtual items includes: performing the following processing for any idle virtual item among the plurality of idle virtual items: obtaining a performance parameter of the idle virtual item in the virtual scene; and sorting the performance parameters of the plurality of idle virtual items in the virtual scene, and selecting an idle virtual item corresponding to a maximum performance parameter for pickable prompting.

For example, referring to FIG. 6, among the idle virtual item 601, the idle virtual item 602, and the idle virtual item 603 in the virtual scene, the idle virtual item 601 has the highest performance parameter (for example, a parameter such as a combat value or a defense value) in the virtual scene. A pickable prompt of the idle virtual item 601 is then displayed in the virtual scene, that is, a pickable control, indicating that the idle virtual item 601 can be picked up. According to performance parameters of the idle virtual items, the idle virtual item with the highest performance parameter is selected from the plurality of idle virtual items for pickable prompting, indicating that the idle virtual item is easy to use and has specific use value. Therefore, the first virtual object picks up a valuable idle virtual item which is beneficial for the first virtual object to play the battle game.

The following processing may be further performed for any idle virtual item among the plurality of idle virtual items: obtaining a virtual coin occupied by the idle virtual item in the virtual scene; and sorting virtual coins occupied by the plurality of idle virtual items in the virtual scene, and selecting an idle virtual item corresponding to a maximum virtual coin for pickable prompting. Therefore, the first virtual object picks up the idle virtual item with the maximum virtual coin, to benefit the most in the virtual scene.

In some embodiments, the displaying pickable prompts of some of the plurality of idle virtual items includes: performing the following processing for any idle virtual item among the plurality of idle virtual items: obtaining a type of a held virtual item of the first virtual object; and performing pickable prompting on the idle virtual item when a type of the idle virtual item is different from the type of the held virtual item.

For example, referring to FIG. 6, among the idle virtual item 601, the idle virtual item 602, and the idle virtual item 603 in the virtual scene, there are various types of the virtual items. For example, the types of the virtual items include shooting, throwing, defensive, attacking, and the like. The idle virtual item 601 is a defensive virtual item, the idle virtual item 602 is a shooting virtual item, and the idle virtual item 603 is a throwing virtual item. The type of the held virtual item of the first virtual object includes shooting, throwing, and attacking. The type of the idle virtual item 601 is different from the type of the held virtual item. A pickable prompt of the idle virtual item 601 is then displayed in the virtual scene, that is, a pickable control, indicating that the idle virtual item 601 can be picked up. According to the types of the held virtual items, virtual items missing from the first virtual object are selected from the plurality of idle virtual items, so that the first virtual object picks up the missing idle virtual items, and the first virtual object has all types of virtual items for more versatile game battles.

In some embodiments, the displaying pickable prompts of some of the plurality of idle virtual items includes: performing the following processing for any idle virtual item among the plurality of idle virtual items: obtaining a type of a held virtual item of the team of the first virtual object; and performing pickable prompting on the idle virtual item when a type of the idle virtual item is different from the type of the held virtual item.

For example, referring to FIG. 6, among the idle virtual item 601, the idle virtual item 602, and the idle virtual item 603 in the virtual scene, there are various types of the virtual items. For example, the types of the virtual items include shooting, throwing, defensive, attacking, and the like. The idle virtual item 601 is a defensive virtual item, the idle virtual item 602 is a shooting virtual item, and the idle virtual item 603 is a throwing virtual item. The type of the held virtual item of the team of the first virtual object includes shooting, throwing, and attacking. The type of the idle virtual item 601 is different from the type of the held virtual item. A pickable prompt of the idle virtual item 601 is then displayed in the virtual scene, that is, a pickable control, indicating that the idle virtual item 601 can be picked up. According to the types of the held virtual items, virtual items missing from the team are selected from the plurality of idle virtual items, so that the first virtual object picks up the missing idle virtual items, and the team of the first virtual object has all types of virtual items for better teamwork.

In some embodiments, the displaying pickable prompts of some of the plurality of idle virtual items includes: performing the following processing for any idle virtual item among the plurality of idle virtual items: obtaining a character assigned to the first virtual object in a team; and performing pickable prompting on the idle virtual item when a type of the idle virtual item matches the character.

For example, referring to FIG. 6, among the idle virtual item 601, the idle virtual item 602, and the idle virtual item 603 in the virtual scene, there are various types of the virtual items. For example, the types of the virtual items include shooting, throwing, defensive, attacking, and the like. The idle virtual item 601 is a defensive virtual item, the idle virtual item 602 is a shooting virtual item, and the idle virtual item 603 is a throwing virtual item. The character assigned to the first virtual object in the team is a shooter. The type of the idle virtual item 601 matches the character of the first virtual object. A pickable prompt of the idle virtual item 601 is then displayed in the virtual scene, that is, a pickable control, indicating that the idle virtual item 601 can be picked up. According to the character assigned to the first virtual object in the team, the virtual item that matches the character of the first virtual object is selected from the plurality of idle virtual items, so that the first virtual object picks up the matching idle virtual item, and the first virtual object has enough virtual items for game battles.

In some embodiments, the displaying a pickable prompt of the idle virtual item includes displaying the pickable prompt of the idle virtual item through a target display style, where the target display style indicates that the idle virtual item is in a pickable state.

For example, after determining that the idle virtual item is pickable, the pickable prompt of the idle virtual item may be displayed through the target display style. The target display style includes highlighting; flashing; different colors (a corresponding display color is determined according to the function of the idle virtual item); and other different presentation styles to highlight that the idle virtual item is in a pickable state.

Step 104: Control the first virtual object to pick up the idle virtual item in response to a picking-up operation of controlling the first virtual object.

For example, after the pickable prompt of the idle virtual item is displayed, the user may control the first virtual object to perform a picking-up operation, thereby displaying the process of picking up the idle virtual item by the first virtual object in the virtual scene. For example, the user controls the first virtual object to approach the idle virtual item and click the pickable control. The first virtual object displays a squatting posture to pick up the idle virtual item, and replaces the currently equipped virtual item of the first virtual object with the idle virtual item.

In some embodiments, a timer is bound on the idle virtual item, and the timer is configured to start timing when the idle virtual item is displayed in the virtual scene. After displaying at least one idle virtual item in a virtual scene, the display of the idle virtual item in the virtual scene is canceled in a case of determining by using the timer that the idle virtual item is not picked up within a set time period.

For example, when an enemy is killed by the first virtual object, the enemy drops a held virtual item. A timer is bound on the dropped virtual item. Within a set time period, if the dropped virtual item is not picked up, the display of the idle virtual item in the virtual scene is canceled. For example, within an hour, if dropped bow and arrow are not picked up, the display of the bow and arrow in the virtual scene is canceled, and all virtual objects in the virtual scene cannot pick up the bow and arrow.

In addition, different virtual items may correspond to different set time periods. For example, according to the type of the idle virtual item, a performance parameter, an occupied virtual coin, and other factors, the corresponding set time period is determined. That is, a more valuable virtual item corresponds to a longer set time period. For example, a combat value of idle virtual item 1 is 2000, and a set time period of idle virtual item 1 is 2 hours. If idle virtual item 1 is not picked up within 2 hours, the display of idle virtual item 1 in the virtual scene is canceled. A combat value of idle virtual item 2 is 1000, and a set time period of idle virtual item 2 is 1 hour. If idle virtual item 2 is not picked up within 1 hour, the display of idle virtual item 2 in the virtual scene is canceled.

The following describes an application of the method for interaction processing of a virtual item provided in the embodiments of this application in a game application scenario.

The embodiments of this application optimize the item pick-up function, so that the virtual object cannot pick up through a wall (that is, when the player cannot see) pickable control not displayed. Otherwise, there is a pickable control for item pick-up which is obviously not visible, resulting in poor experience.

The embodiments of this application optimize the item pick-up function in the following manners: 1) when passing through the wall, a pickable control of an item is not displayed; 2) the detection logic for determining whether the item can be picked up is optimized; and 3) the picking sequence is followed by the nearer and the farthest. The following describes how to optimize the item pick-up function:

1) When passing through the wall, a pickable control of an item is not displayed.

Figure 7:
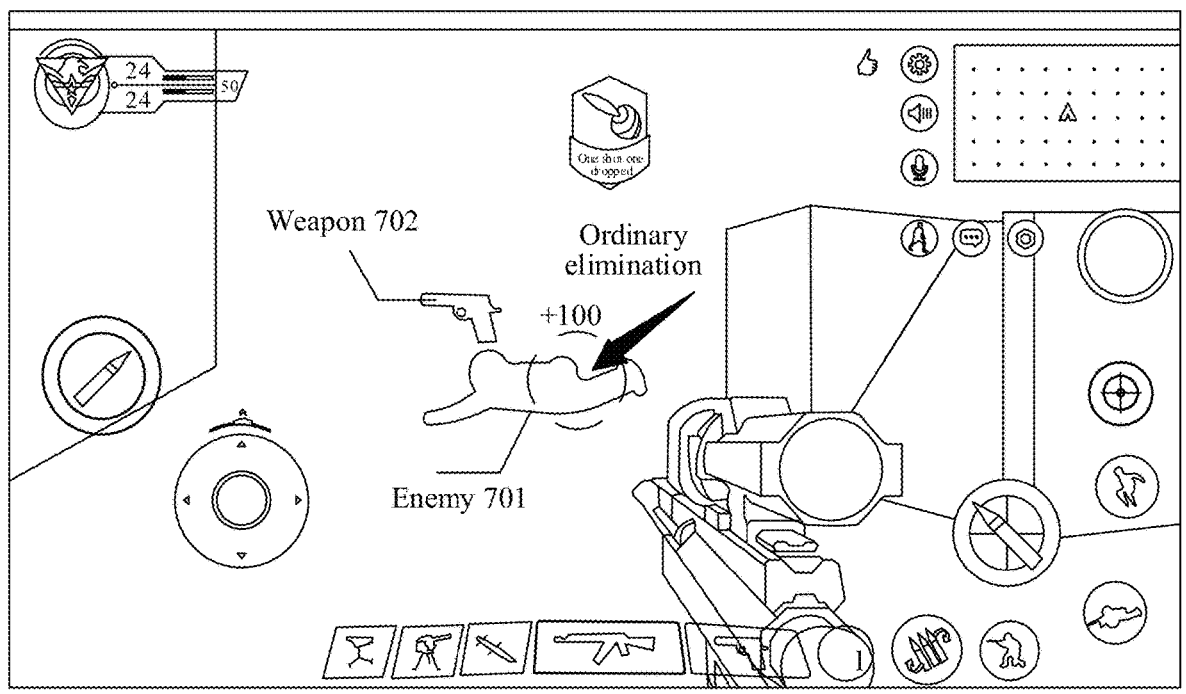
FIG. 7 is a schematic diagram of an interface of a dropped weapon according to an embodiment of this application.
Figure 8:
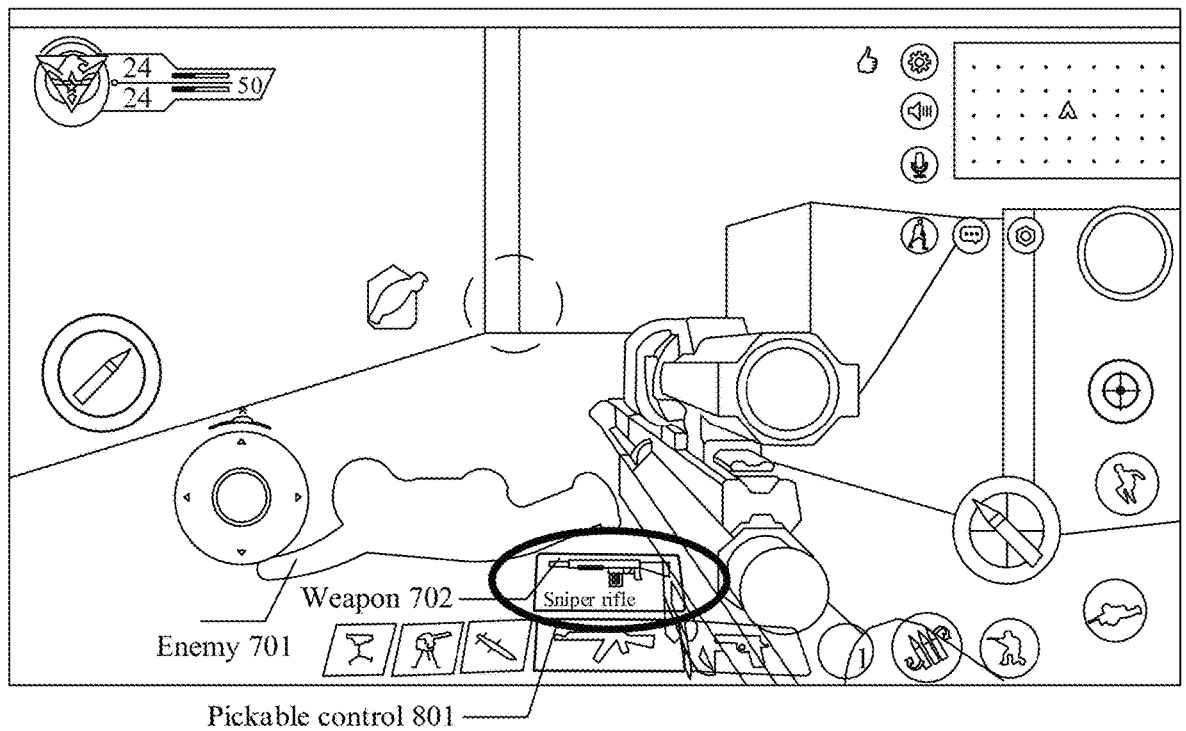
FIG. 8 is a schematic diagram of an interface of a dropped weapon according to an embodiment of this application.

FIG. 7 is a schematic diagram of an interface of a dropped weapon according to an embodiment of this application. In a game, each time an enemy is killed, the enemy 701 drops a currently used weapon 702 at the position being killed. FIG. 8 is a schematic diagram of an interface of a dropped weapon according to an embodiment of this application. When the virtual object controlled by the user is close to the weapon 702 dropped on the ground, weapon information is displayed in the virtual scene, and the weapon 702 can be picked up by clicking a pickable control 801.

Figure 9:
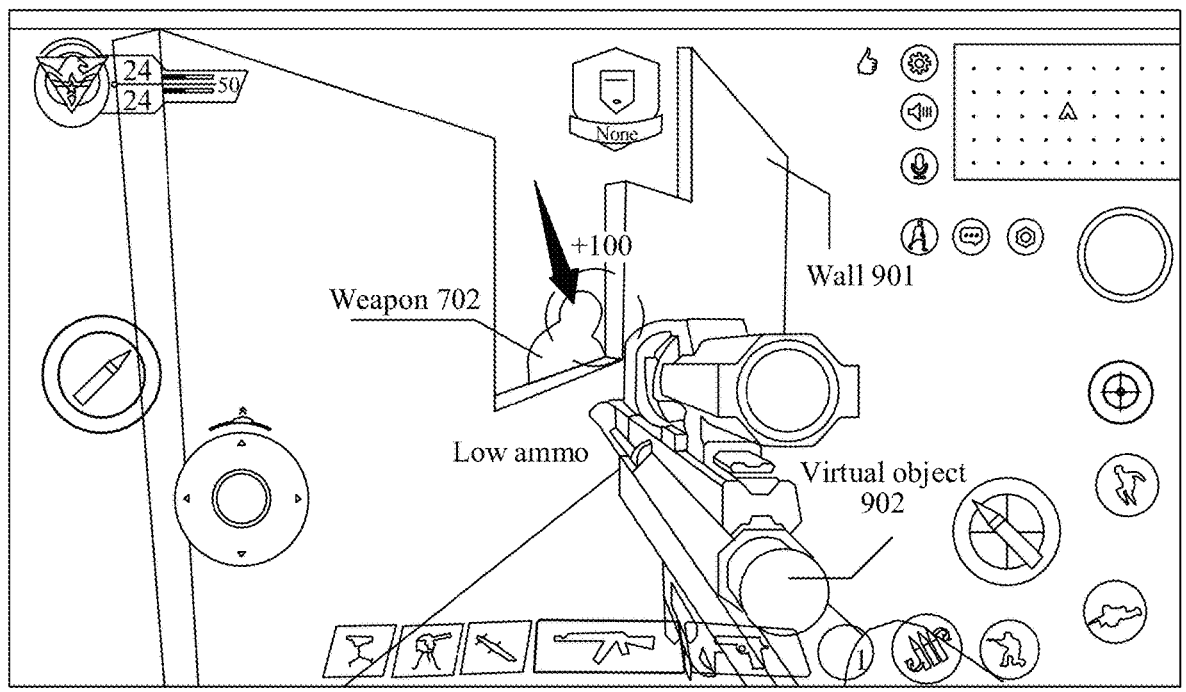
FIG. 9 is a schematic diagram of an interface of a dropped weapon according to an embodiment of this application.

FIG. 9 is a schematic diagram of an interface of a dropped weapon according to an embodiment of this application. However, during the game, there is a situation that after the enemy is killed, the weapon 702 of the enemy just falls to a left side of a wall 901, and a virtual object 902 controlled by the user is on a right side of the wall 901.

In this case, if the virtual object 902 controlled by the user is close to the wall 901, it is determined whether there is an obstacle between the weapon 702 and the virtual object 902. When there is an obstacle between the weapon 702 and the virtual object 902, the pickable control cannot be displayed, the weapon 702 cannot be picked up, and the virtual object 902 controlled by the user needs to go around the left side of the wall to pick up the weapon 702.

2) The detection logic for determining whether the item can be picked up is optimized.

In the related art, a collision box is bound to a dropped weapon, which causes the following problems:

a) Picking up through a wall can be achieved.
b) Limited by the collision box, the dropped weapon can only be detected when entering the collision box and exiting the collision box. If the dropped weapon just falls at the position of the virtual object, since the virtual object is inside the collision box of the dropped weapon, the virtual object needs to exit the collision box first, and then enter the collision box to trigger the logic of displaying the pickable control.
c) Dropped weapons on a top floor may pass through the floor and be picked up by the virtual object on a bottom floor.

To optimize the detection logic of whether pickable or not, in this embodiment of this application, the collision box may not be bound on the dropped weapon, and the problem caused by the collision box can be resolved by detecting whether there is an obstacle between the virtual object and the dropped weapon.

3) The picking sequence is followed by the nearer and the farthest.

Figure 10:
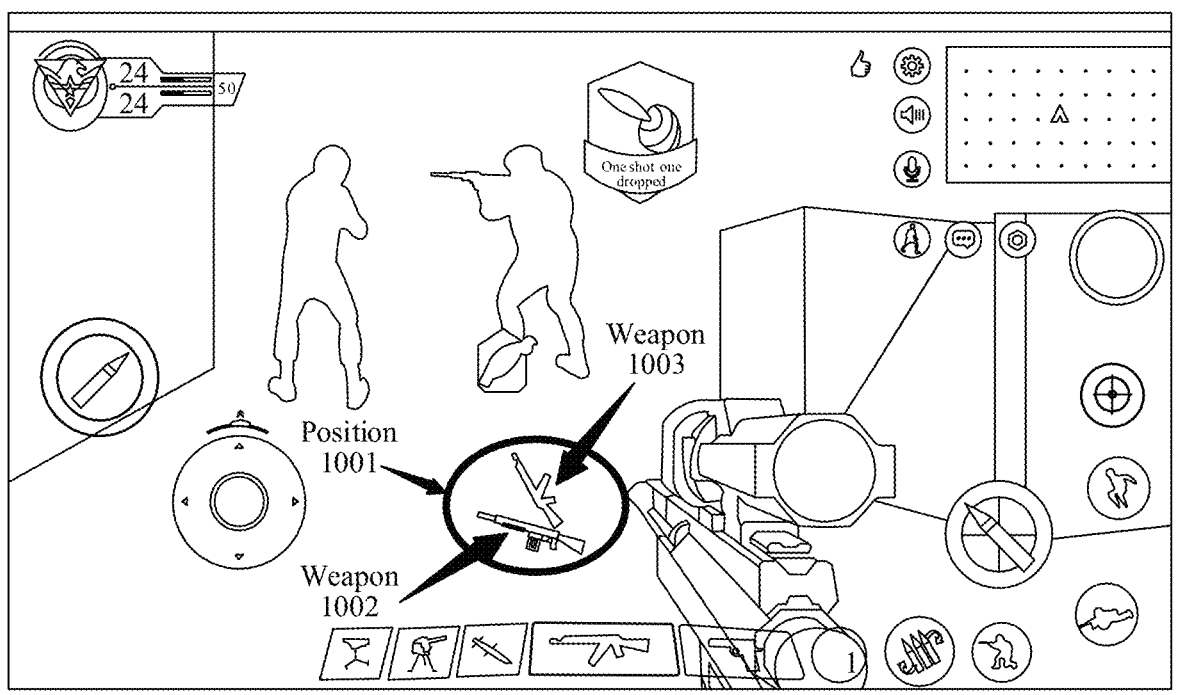
FIG. 10 is a schematic diagram of an interface of a dropped weapon according to an embodiment of this application.

FIG. 10 is a schematic diagram of an interface of a dropped weapon according to an embodiment of this application. When there is a plurality of dropped weapons (a weapon 1002 and a weapon 1003) at the same position 1001, if the virtual object controlled by the user is close to the position 1001 and the weapon can be picked up, the weapon 1002 closer to the virtual object is displayed first.

Figure 11:
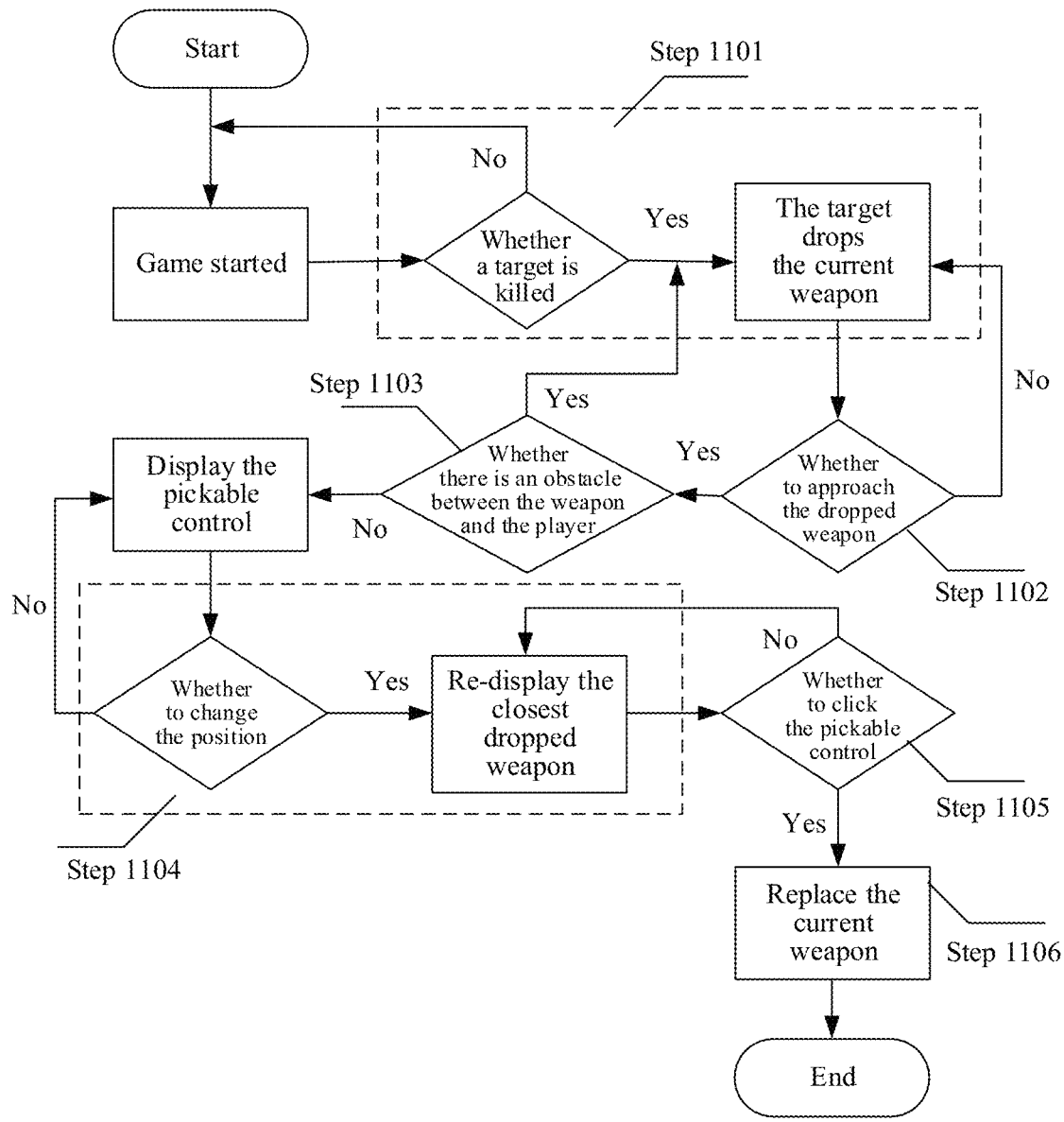
FIG. 11 is a schematic flowchart of interaction processing of a virtual item according to an embodiment of this application.

For ease of understanding this embodiment of this application, FIG. 11 is a schematic flowchart of interaction processing of a virtual item according to an embodiment of this application. A description is made with reference to steps shown in FIG. 11.

Step 1101: After the game is started, the virtual object controlled by the user may find a target (an enemy) to kill. During the game, a target needs to be killed before a weapon can be dropped. Certainly, it is not necessarily an enemy who is killed, and a teammate may be killed (if a teammate is killed, it is displayed that a dropped weapon is dropped by the teammate).

Step 1102: When a target dies on the scene, the virtual object controlled by the user may move to approach a dropped weapon. Since there is no collision box mounted on the dropped weapon, the weapon is not picked up by triggering a response, but by mathematical position distance calculation.

Figure 12:
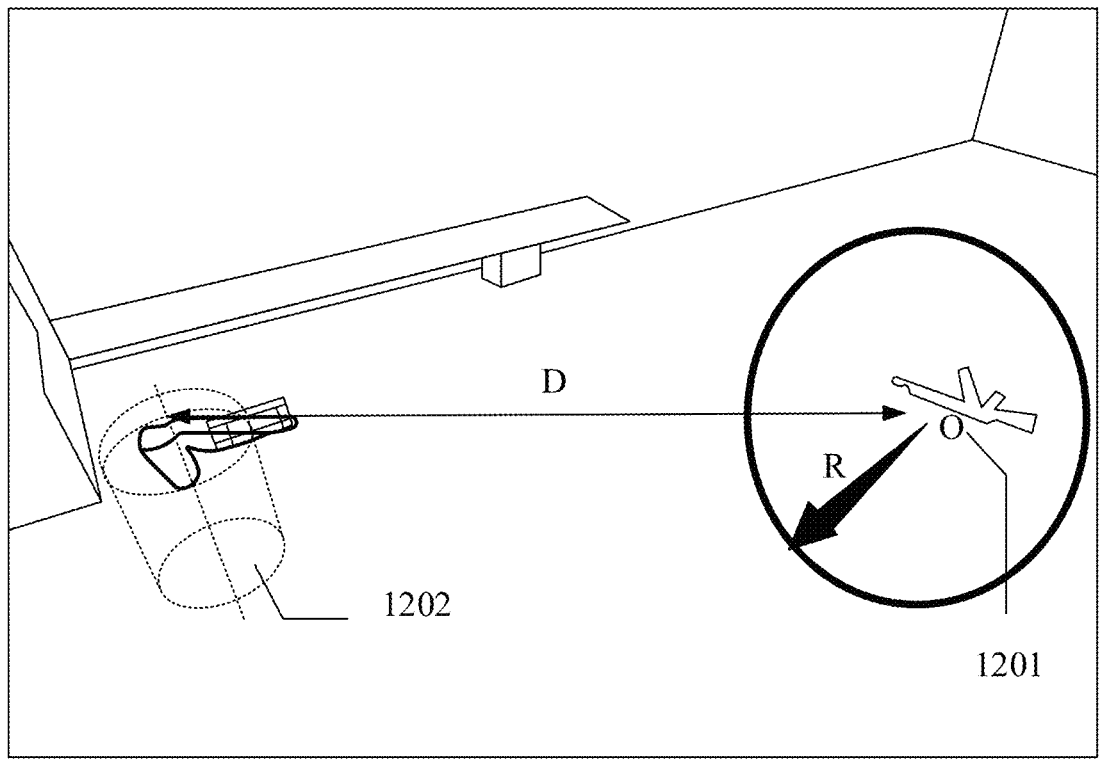
FIG. 12 is a schematic diagram of an interface of distance calculation according to an embodiment of this application.

FIG. 12 is a schematic diagram of an interface of distance calculation according to an embodiment of this application. A point 1201 represents a position of a dropped weapon, and R represents a pickable radius. A distance between the point 1201 and a virtual object 1202 is calculated to obtain a distance D. If the distance D is less than R, the virtual object 1202 is within a pickable range, that is, the virtual object 1202 is close to the dropped weapon. If the distance D is greater than R, the virtual object 1202 is not within the pickable range, that is, the virtual object 1202 is far away from the dropped weapon.

Figure 13:
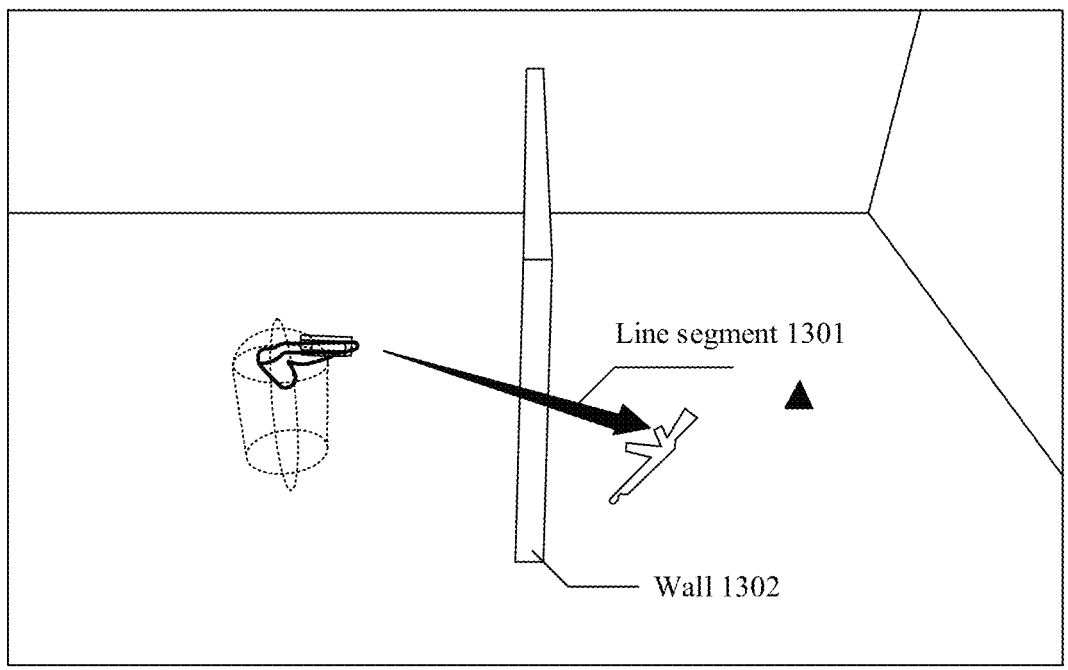
FIG. 13 is a schematic diagram of an interface of obstacle detection according to an embodiment of this application.

Step 1103: Determine whether there is an obstacle between the virtual object and the dropped weapon. The detection method is to shoot a detection ray at a muzzle position of a used weapon of the virtual object, where an end point is the dropped weapon. FIG. 13 is a schematic diagram of an interface of obstacle detection according to an embodiment of this application. A line segment 1301 is a detection ray. When the ray intersects an obstacle, the obstacle is detected, such as a wall 1302. Therefore, even if the detection of the distance range is satisfied, when an obstacle is detected, the dropped weapon cannot be picked up.

Step 1104: If there are a plurality of dropped weapons within the same range, distances between positions of all the dropped weapons and the virtual object are calculated, and a pickable control of a dropped weapon closest to the virtual object is displayed.

Step 1105: After the user clicks the pickable control, a pick-up protocol is sent to the server, and the server checks whether the current weapon is picked up or disappears. Replace with the current weapon. If it is determined that the current weapon can be picked up, a successful pick-up is returned, and the weapon used by the virtual object is replaced with the current weapon.

Step 1106: If the dropped weapon is not picked up for a specific time period, the dropped weapon disappears in the game.

Therefore, the embodiments of this application optimize the item pick-up function, so that the virtual object cannot pick up through a wall (that is, when the player cannot see) pickable control not displayed, improving the user experience.

The method for interaction processing of a virtual item provided in the embodiments of this application is described with reference to the application and implementation of the terminal provided in the embodiments of this application. The following continues to describe the solution in which the modules in the apparatus 455 for interaction processing of a virtual item provided in the embodiments of this application cooperate to realize the interaction processing of a virtual item of multimedia information.

The display module 4551 is configured to display at least one idle virtual item in a virtual scene. The response module 4552 is configured to control, in response to a movement operation of controlling a first virtual object, the first virtual object to move in the virtual scene. The processing module 4553 is configured to display a pickable prompt of the idle virtual item when the idle virtual item is located in a direction consistent with an orientation of a equipped virtual item of the first virtual object and there is no obstacle between the idle virtual item and the equipped virtual item of the first virtual object. The response module 4552 is further configured to control the first virtual object to pick up the idle virtual item in response to a picking-up operation of controlling the first virtual object.

In some embodiments, the apparatus 455 for interaction processing of a virtual item further includes the detection module 4554, configured to detect a distance between the first virtual object and the idle virtual item during the movement; and perform obstacle detection between the equipped virtual item of the first virtual object and the idle virtual item when the distance is less than a distance threshold.

In some embodiments, the detection module 4554 is further configured to perform obstacle detection between the equipped virtual item of the first virtual object and the idle virtual item based on each real-time position of the first virtual object during the movement.

In some embodiments, the detection module 4554 is further configured to emit a detection ray at a position of the equipped virtual item of the first virtual object by using a camera component bound on the equipped virtual item of the first virtual object, where an orientation of the detection ray is consistent with the orientation of the equipped virtual item of the first virtual object; and determine whether there is an obstacle between the equipped virtual item of the first virtual object and the idle virtual item based on the detection ray.

In some embodiments, the detection module 4554 is further configured to determine, when the detection ray intersects with a collider component bound on an obstacle, that the obstacle exists between the equipped virtual item of the first virtual object and the idle virtual item; and determine, when the detection ray does not intersect with the collider component bound on the obstacle, that the obstacle does not exist between the equipped virtual item of the first virtual object and the idle virtual item.

In some embodiments, the processing module 4553 is further configured to display a non-pickable prompt of the idle virtual item when the idle virtual item is located in the orientation of the equipped virtual item of the first virtual object and there is an obstacle between the idle virtual item and the equipped virtual item of the first virtual object.

In some embodiments, the processing module 4553 is further configured to display, when a plurality of idle virtual items are located in the orientation of the equipped virtual item of the first virtual object and there is no obstacle between the plurality of idle virtual items and the equipped virtual item of the first virtual object, pickable prompts of some of the plurality of idle virtual items.

In some embodiments, the processing module 4553 is further configured to perform the following processing for any idle virtual item among the plurality of idle virtual items: obtaining a distance between the first virtual object and the idle virtual item during the movement; and sorting the distances between the plurality of idle virtual items and the first virtual object, and selecting an idle virtual item corresponding to a minimum distance for pickable prompting.

In some embodiments, the processing module 4553 is further configured to perform the following processing for any idle virtual item among the plurality of idle virtual items: obtaining, based on usage preference of the first virtual object for virtual items, a matching degree between the idle virtual item and the usage preference; and sorting the matching degrees between the plurality of idle virtual items and the usage preference, and selecting an idle virtual item corresponding to a highest matching degree for pickable prompting.

In some embodiments, the processing module 4553 is further configured to perform the following processing for any idle virtual item among the plurality of idle virtual items: obtaining a frequency that the idle virtual item is used by other virtual objects; and sorting the frequencies that the plurality of idle virtual items are used by other virtual objects, and selecting an idle virtual item corresponding to a maximum frequency for pickable prompting.

In some embodiments, the processing module 4553 is further configured to perform the following processing for any idle virtual item among the plurality of idle virtual items: obtaining a performance parameter of the idle virtual item in the virtual scene; and sorting the performance parameters of the plurality of idle virtual items in the virtual scene, and selecting an idle virtual item corresponding to a maximum performance parameter for pickable prompting.

In some embodiments, the processing module 4553 is further configured to perform the following processing for any idle virtual item among the plurality of idle virtual items: obtaining a type of a held virtual item of the first virtual object; and performing pickable prompting on the idle virtual item when a type of the idle virtual item is different from the type of the held virtual item.

In some embodiments, the processing module 4553 is further configured to perform the following processing for any idle virtual item among the plurality of idle virtual items: obtaining a character assigned to the first virtual object in a team; and performing pickable prompting on the idle virtual item when a type of the idle virtual item matches the character.

In some embodiments, the processing module 4553 is further configured to display the pickable prompt of the idle virtual item through a target display style, where the target display style indicates that the idle virtual item is in a pickable state.

In some embodiments, the apparatus 455 for interaction processing of a virtual item further includes the timing module 4555, configured to bind a timer on the idle virtual item, where the timer is configured to start timing when the idle virtual item is displayed in the virtual scene; and stop the display of the idle virtual item in the virtual scene in a case of determining by using the timer that the idle virtual item is not picked up within a set time period.

In some embodiments, the display module 4551 is further configured to display, when a second virtual object is attacked in the virtual scene and loses a capability of a held virtual item, at least one virtual item dropped by the second virtual object at a position where the second virtual object is attacked.

In some embodiments, the display module 4551 is further configured to use, when a second virtual object actively discards at least one held virtual item in the virtual scene, the held virtual item as an idle virtual item; and display the at least one actively discarded virtual item at a position where the second virtual object discards the held virtual item.

In some embodiments, the display module 4551 is further configured to use, when a teammate of the first virtual object places at least one held virtual item at a placement position in the virtual scene, the held virtual item as an idle virtual item, where the idle virtual item is configured to be picked up by the first virtual object; and display the at least one idle virtual item placed by the teammate at the placement position in a map of the virtual scene.

An embodiment of this application provides a computer program product or a computer program. The computer program product or the computer program includes computer instructions, and the computer instructions are stored in a computer-readable storage medium. A processor of an electronic device reads the computer instructions from the computer-readable storage medium and executes the computer instructions to cause the electronic device to perform the foregoing method for interaction processing of a virtual item of the embodiments of this application.

An embodiment of this application provides a computer-readable storage medium storing executable instructions. The executable instructions, when executed by a processor, cause the processor to perform the method for interaction processing of a virtual item provided in the embodiments of this application, for example, the method for interaction processing of a virtual item shown in FIG. 3A to FIG. 3C.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM; or may be any device including one of or any combination of the foregoing memories.

In some embodiments, the executable instructions may be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one electronic device, execution on a plurality of electronic devices located at one location, or execution on a plurality of electronic devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A method for interaction processing of a virtual item, comprising:
   displaying at least one idle virtual item in a virtual scene;
   moving a first virtual object in the virtual scene in response to a movement operation on the first virtual object;
   in response to determining that there is no obstacle between the idle virtual item and the first virtual object, displaying a pickable prompt of the idle virtual item, and controlling the first virtual object to pick up the idle virtual item in response to a picking-up operation by the first virtual object; and
   in response to determining that the idle virtual item is located in a direction consistent with an orientation of an equipped virtual item of the first virtual object and there is an obstacle between the idle virtual item and the equipped virtual item, displaying a non-pickable prompt of the idle virtual item.

2. The method according to claim 1, wherein before the displaying the pickable prompt of the idle virtual item, the method further comprises:
   determining that the idle virtual item is located in a direction consistent with an orientation of the first virtual object;
   detecting a distance between the first virtual object and the idle virtual item during the movement operation; and
   detecting obstacle between the first virtual object and the idle virtual item when the detected distance is less than a distance threshold.

3. The method according to claim 1, wherein before the displaying the pickable prompt of the idle virtual item, the method further comprises:
   detecting obstacle between the first virtual object and the idle virtual item based on a real-time position of the first virtual object during the movement.

4. The method according to claim 2, wherein the detecting obstacle between the first virtual object and the idle virtual item comprises:
   emitting a detection ray at a position of the equipped virtual item of the first virtual object by using a camera component bound on the equipped virtual item, wherein a direction of the detection ray is consistent with the orientation of the equipped virtual item of the first virtual object; and
   determining whether there is an obstacle between the equipped virtual item of the first virtual object and the idle virtual item based on the detection ray.

5. The method according to claim 4, wherein the determining whether there is an obstacle between the equipped virtual item of the first virtual object and the idle virtual item based on the detection ray comprises:
   determining that the obstacle exists between the equipped virtual item of the first virtual object and the idle virtual item when the detection ray intersects with a collider component bound on an obstacle; and
   determining that the obstacle does not exist between the equipped virtual item of the first virtual object and the idle virtual item when the detection ray does not intersect with the collider component bound on the obstacle.

6. The method according to claim 1, wherein the displaying the pickable prompt of the idle virtual item when the idle virtual item is located in a direction consistent with an orientation of the equipped virtual item of the first virtual object and there is no obstacle between the idle virtual item and the equipped virtual item comprises:

displaying pickable prompts of one or more of a plurality idle virtual items when the plurality of idle virtual items are located in the direction consistent with the orientation of the equipped virtual item of the first virtual object and there is no obstacle between the plurality of idle virtual items and the equipped virtual item.

7. The method according to claim 6, wherein the displaying pickable prompts of one or more of the plurality of idle virtual items comprises:

obtaining a distance between the first virtual object and an idle virtual item during the movement operation; and sorting the distances between the plurality of idle virtual items and the first virtual object, and selecting an idle virtual item corresponding to a minimum distance for pickable prompting.

8. The method according to claim 6, wherein the displaying pickable prompts of one or more of idle virtual items comprises:

obtaining a matching degree between each idle virtual item and the usage preference, based on usage preference of the first virtual object for virtual items; and sorting the matching degrees between the plurality of idle virtual items and the usage preference, and selecting an idle virtual item corresponding to a highest matching degree for pickable prompting.

9. The method according to claim 6, wherein the displaying pickable prompts of one or more of the plurality of idle virtual items comprises:

obtaining a frequency that each idle virtual item is used by other virtual objects; and sorting the frequencies that the plurality of idle virtual items used by other virtual objects, and selecting an idle virtual item corresponding to a maximum frequency for pickable prompting.

10. The method according to claim 6, wherein the displaying pickable prompts of one or more of the plurality of idle virtual items comprises:

obtaining a performance parameter of each idle virtual item in the virtual scene; and sorting the performance parameters of the plurality of idle virtual items in the virtual scene, and selecting an idle virtual item corresponding to a maximum performance parameter for pickable prompting.

11. The method according to claim 6, wherein the displaying pickable prompts of one or more of the plurality of idle virtual items comprises:

obtaining a type of a held virtual item of the first virtual object; and performing pickable prompting on an idle virtual item when a type of the idle virtual item is different from the type of the held virtual item.

12. The method according to claim 6, wherein the displaying pickable prompts of one or more of the plurality of idle virtual items comprises:

obtaining a character assigned to the first virtual object in a team; and performing pickable prompting on an idle virtual item when a type of the idle virtual item matches the character.

13. The method according to claim 1, wherein the displaying the pickable prompt of the idle virtual item comprises:

displaying the pickable prompt of the idle virtual item through a target display style, wherein the target display style indicates that the idle virtual item is in a pickable state.

14. The method according to claim 1, the method further comprising:

binding a timer on the idle virtual item, wherein the timer is configured to start timing when the idle virtual item is displayed in the virtual scene; and stopping the display of the idle virtual item in the virtual scene if the idle virtual item is not picked up within a set time period recorded by the timer.

15. The method according to claim 1, wherein the displaying at least one idle virtual item in the virtual scene comprises:

using the held virtual item as an idle virtual item when a second virtual object is attacked in the virtual scene and loses a capability of a held virtual item; and displaying at least one virtual item dropped by the second virtual object at a position wherein the second virtual object is attacked.

16. The method according to claim 1, wherein the displaying at least one idle virtual item in the virtual scene comprises:

using a held virtual item as an idle virtual item when a second virtual object discards at least one held virtual item in the virtual scene; and displaying the discarded virtual item at a position wherein the second virtual object discards the held virtual item.

17. The method according to claim 1, wherein the displaying at least one idle virtual item in the virtual scene comprises:

using a held virtual item as an idle virtual item when a teammate of the first virtual object places the held virtual item at a placement position in the virtual scene, wherein the idle virtual item is configured to be picked up by the first virtual object; and displaying the at least one idle virtual item placed by the teammate at the placement position in a map of the virtual scene.

18. An electronic device, comprising:

a memory, configured to store executable instructions; and a processor, configured to, when executing the executable instructions stored in the memory, implement:

displaying at least one idle virtual item in a virtual scene;

moving a first virtual object to move in the virtual scene in response to a movement operation on the first virtual object;

in response to determining that there is no obstacle between the idle virtual item and the first virtual object, displaying a pickable prompt of the idle virtual item, and controlling the first virtual object to pick up the idle virtual item in response to a picking-up operation by the first virtual object; and in response to determining that the idle virtual item is located in a direction consistent with an orientation of an equipped virtual item of the first virtual object and there is an obstacle between the idle virtual item and the equipped virtual item, displaying a non-pickable prompt of the idle virtual item.

19. A non-transitory computer-readable storage medium, storing executable instructions, the executable instructions, when executed by at least one processor, causing the at least one processor to implement:
- displaying at least one idle virtual item in a virtual scene;
- moving a first virtual object to in the virtual scene in response to a movement operation on the first virtual object;
- in response to determining that there is no obstacle between the idle virtual item and the first virtual object, displaying a pickable prompt of the idle virtual item, and controlling the first virtual object to pick up the idle virtual item in response to a picking-up operation by the first virtual object; and
- in response to determining that the idle virtual item is located in a direction consistent with an orientation of an equipped virtual item of the first virtual object and there is an obstacle between the idle virtual item and the equipped virtual item, displaying a non-pickable prompt of the idle virtual item.

* * * * *